US005764779A

United States Patent [19]

Haranishi

[11] Patent Number: 5,764,779

[45] Date of Patent: Jun. 9, 1998

[54] METHOD AND APPARATUS FOR DETERMINING THE DIRECTION OF A SOUND SOURCE

[75] Inventor: Masaki Haranishi, Fujisawa, Japan

[73] Assignee: Canon Kabushiki Kaisha, Tokyo, Japan

[21] Appl. No.: 291,224

[22] Filed: Aug. 16, 1994

[30] Foreign Application Priority Data

Aug. 25, 1993 [JP] Japan .................................... 5-232287

[51] Int. Cl.[6] .................................................. G01S 3/80

[52] U.S. Cl. ............................................. 381/71; 381/110

[58] Field of Search ............................... 381/38, 110, 71; 395/2.16, 2.26, 2.23, 2.24, 2.4, 2.42, 2.44

[56] References Cited

U.S. PATENT DOCUMENTS

| | | | |
|---|---|---|---|
| 4,164,626 | 8/1979 | Fette | 179/1 SC |
| 4,449,189 | 5/1984 | Feix et al. | 395/2.82 |
| 4,912,764 | 3/1990 | Hartwell et al. | 381/38 |
| 5,099,455 | 3/1992 | Parra | 367/120 |
| 5,319,715 | 6/1994 | Nagami et al. | 381/71 |

FOREIGN PATENT DOCUMENTS 0092611 4/1982 European Pat. Off. .

*Primary Examiner*—Edward L. Coles, Sr.
*Assistant Examiner*—Stephen Brinich
*Attorney, Agent, or Firm*—Morgan & Finnegan

[57] ABSTRACT

FIG. 1 illustrates the construction of an audio signal processor according to the present invention. An audio signal enters from a microphone 1 and a bandpass filter 2 extracts the frequency band of the human voice. The resulting signal is amplified by an amplifier 3. A level detecting circuit 4 detects the level of the amplified signal. A level discriminating circuit 5 determines if the level is greater than the value. If yes, the circuit 5 outputs a switch-on signal. Or else, the circuit 5 outputs a switch-off signal. An A/D converter 6 converts the analog signal entering from the circuit 5 into a digital signal. A pitch detecting circuit 7 detects the pitch of the digital signal. A pitch discriminating circuit 8 determines if the pitch of the signal agrees with a prescribed pitch. If yes, the circuit 8 outputs the switch-on signal to the voice-output control switch 13. On the basis of the switch-on or switch-off signal, the switch 13 generates an on/off control signal, which causes a voltage-controlled amplifier 9 to amplify and output the voice signal and output to a mixer 10. Voice processing circuits S and S' are identical in construction. Microphones 1, 1' of the processing circuits S, S' are connected to a mixer 10. The latter mixes the audio outputted by the microphones 1, 1'. An amplifier 11 amplifies the mixed voice signals. A speaker 12 outputs the audio.

20 Claims, 15 Drawing Sheets

PEAK VALUE OF FIRST FRAME

PEAK VALUE OF SECOND FRAME

RESULTS OF INTEGRATING PEAK VALUES

RESULTS OF EXTRACTING CENTROID OF PEAK VALUES

METHOD AND APPARATUS FOR DETERMINING THE DIRECTION OF A SOUND SOURCE

BACKGROUND OF THE INVENTION

This invention relates to an audio signal processing method and apparatus and, more particularly, to an audio signal processing method and apparatus in a television conference system using a plurality of microphones (input means) in which it is possible to determine whether an individual in front of a microphone is currently speaking or not and whether an audio signal that has entered via a microphone is a voice signal or an unnecessary sound such as noise.

DESCRIPTION OF THE RELATED ART

In conventional television conference systems, a signal processor for the purpose of controlling video cameras uses a level detector to detect the level of an audio signal that has entered via a microphone and determines, on the basis of the level detected by the level detector, whether an individual in front of the microphone is currently speaking or not. In other words, when the level of the audio signal exceeds a predetermined value, the signal processor judges that the individual in front of the microphone is currently speaking, turns on an audio output switch that delivers the signal from the microphone to a speaker serving as an output device, and changes over from one video camera to another so that the video camera will point in the direction of the microphone.

In such a system in which control is performed to switch among video cameras on the basis of the audio signal, the video cameras react to undesirable sounds such as noise and reverberation by operating erroneously.

In order to solve this problem, attempts have recently been made to provide the microphones with directivity so as to minimize the pick-up of undesirable sounds such as noise and reverberation.

However, the pick-up of undesirable sounds such as noise and reverberation cannot be prevented reliably even with a highly directional microphones. In addition, there is an increase in total gain when the audio output switch for delivering signals from a plurality of microphones to the output device is turned on. Moreover, the pick-up of undesirable sounds such as noise and reverberation worsens the overall S/N ratio and causes an audio signal to penetrate the plurality of microphones. This is a cause of howling.

Accordingly, in the conventional audio signal processor, it is not possible to reliably determine whether an individual in front of a microphone is currently speaking or not and whether an audio signal that has entered via a microphone is a voice signal or an undesirable sound such as noise. As a result, the video cameras operate erroneously by reacting to these undesirable sounds.

SUMMARY OF THE INVENTION

Accordingly, an object of the present invention is to provide an audio signal processing method and apparatus capable of reliably preventing pick-up of undesirable sounds, namely sounds other than the voice, and of determining whether an individual in front of input means is currently speaking or whether an audio signal entering via the input means is a voice signal or undesirable sound.

In accordance with the present invention, the foregoing object is attained by providing a signal processing method comprising an input step of entering an audio signal, a pitch detecting step of detecting the pitch of the audio signal entered at said input step, and an signal control output step of outputting a signal corresponding to the audio signal if the pitch of the audio signal detected at said pitch detecting step is approximately equal to a prescribed pitch.

Further, the foregoing object is attained by providing a signal processing apparatus comprising an input step of entering an audio signal, a voice bandpass filtering step of subjecting the entered signal to voice bandpass filtering processing and generating a voice band signal, a level detecting step of detecting the level of the voice band signal and generating a level signal, a pitch detecting step of detecting the pitch of the voice band signal and generating a pitch signal, and, an audio output step of outputting a sound corresponding to the audio signal entered at said input step if the level signal is greater than a prescribed threshold value and the pitch signal is approximately equal to a prescribed pitch.

Further, the foregoing object is attained by providing a signal processing apparatus comprising an input step of entering an audio signal from each of a plurality of audio input means, a level detecting step of detecting the level of each audio signal entered at said input step and generating a level signal corresponding to each audio signal, a pitch detecting step of detecting the pitch of each audio signal entered at said input step, an image-formation request signal generating step of generating an image-formation request signal corresponding to each audio signal if each level signal is greater than a prescribed threshold value and the pitch of each audio signal detected at said pitch detecting step is approximately equal to a prescribed pitch, a selecting step of selecting some image pick-up means from a plurality of image pick-up means based upon each image-formation request signal generated at said image-formation request signal generating step, and an image forming step of sending an image picked up by the image pick-up means selected at said selecting step to image forming means and causing said image forming means to form the corresponding image.

Further, the foregoing object is attained by providing a signal processing apparatus comprising an input step of entering an audio signal from each of a plurality of audio input means, a pitch detecting step of detecting the pitch of each audio signal entered at said input step, an image-formation request signal generating step of generating an image-formation request signal corresponding to each audio signal if the pitch of each audio signal detected at said pitch detecting step is approximately equal to a prescribed pitch, a selecting step of selecting some image pick-up means from a plurality of image pick-up means based upon each image-formation request signal generated at said image-formation request signal generating step, and, an image forming step of sending an image picked up by the image pick-up means selected at said selecting step to image forming means and causing said image forming means to form the corresponding image.

Further, the foregoing object is attained by providing a signal processing apparatus comprising, an input step of entering an audio signal, a level detecting step of detecting the level of the audio signal entered at said input step and generating a level signal, a period detecting step of detecting the period of the audio signal entered at said input step, and a selecting step of selecting corresponding image pick-up means and inputting an image to said selected pick-up means if the level signal is greater than a prescribed threshold value and the period detected at said period detecting step falls within a prescribed range.

Further, the foregoing object is attained by providing a signal processing apparatus comprising an input step of entering an audio signal, a level detecting step of detecting the level of the audio signal entered at said input step and generating a level signal, a period detecting step of detecting the period of the audio signal entered at said input step, and an audio control output step of outputting a sound corresponding to the audio signal entered at said input step if the level signal is greater than a prescribed threshold value and the period detected at said period detecting step falls within a prescribed range.

Further, the foregoing object is attained by providing a signal processing apparatus comprising an input means of entering an audio signal, a pitch detecting means of detecting the pitch of the audio signal entered at said input means, and an signal control output means of outputting a signal corresponding to the audio signal if the pitch of the audio signal detected at said pitch detecting means is approximately equal to a prescribed pitch.

Further, the foregoing object is attained by providing a signal processing apparatus comprising input means for entering an audio signal, voice bandpass filtering means for subjecting the entered signal to voice bandpass filtering processing and generating a voice band signal, level detecting means for detecting the level of the voice band signal and generating a level signal, pitch detecting means for detecting the pitch of the voice band signal and generating a pitch signal, and audio output means for outputting a sound corresponding to the audio signal entered by said input means if the level signal is greater than a prescribed threshold value and the pitch signal is approximately equal to a prescribed pitch.

Further, the foregoing object is attained by providing a signal processing apparatus comprising input means for entering an audio signal, level detecting means for detecting the level of the audio signal entered by said input means and generating a level signal, a plurality of signal processing means, each of which includes pitch detecting means for detecting the pitch of the audio signal entered by said input means and means for generating an image-formation request signal if the level signal is greater than a prescribed threshold value and the pitch of the audio signal detected by said pitch detecting means is approximately equal to a prescribed pitch, selecting means for selecting some image pick-up means from a plurality of image pick-up means based upon each image-formation request signal generated by a respective one of said signal processing means, and, image forming means for sending an image picked up by the image pick-up means selected by said selecting means to image forming means and causing said image forming means to form the corresponding image.

Further, the foregoing object is attained by providing a signal processing apparatus comprising input means for entering an audio signal, a plurality of signal processing means, each of which includes pitch detecting means for detecting the pitch of the audio signal entered by said input means and means for generating an image-formation request signal if the pitch of the audio signal detected by said pitch detecting means is approximately equal to a prescribed pitch, selecting means for selecting some image pick-up means from a plurality of image pick-up means based upon each image-formation request signal generated by a respective one of said signal processing means, and image forming means for sending an image picked up by the image pick-up means selected by said selecting means to image forming means and causing said image forming means to form the corresponding image.

Further, the foregoing object is attained by providing a signal processing apparatus comprising level detecting means for detecting the level of the audio signal entered by said input means and generating a level signal, period detecting means for detecting the period of the audio signal entered by said input means, and selecting means for selecting corresponding image pick-up means and inputting an image to said selected pick-up means if the level signal is greater than a prescribed threshold value and the period detected by said period detecting means falls within a prescribed range.

Further, the foregoing object is attained by providing a signal processing apparatus comprising input means for entering an audio signal, level detecting means for detecting the level of the audio signal entered by said input means and generating a level signal, period detecting means for detecting the period of the audio signal entered by said input means, and audio control output means for outputting a sound corresponding to the audio signal entered by said input means if the level signal is greater than a prescribed threshold value and the period detected by said period detecting means falls within a prescribed range.

Further, the foregoing object is attained by providing a signal processing method comprising an input step of entering an audio signal from each of a plurality of audio input means, a level detecting step of detecting the level of each audio signal entered at said input step and generating a level signal corresponding to each audio signal, a pitch detecting step of detecting the pitch of each audio signal entered at said input step, a voice-formation request signal generating step of generating a voice-formation request signal corresponding to each audio signal if each level signal is greater than a prescribed threshold value and the pitch of each audio signal detected at said pitch detecting step is approximately equal to a prescribed pitch, a synthesizing step of synthesizing each audio signal corresponding to each voice-formation request signal generated at said voice-formation request signal generating step, and an audio output step of outputting a sound corresponding to the audio signal, which has been synthesized at said synthesizing step, from audio output means.

Further, the foregoing object is attained by providing a signal processing apparatus comprising, input means for entering an audio signal from each of a plurality of audio input means, level detecting means for detecting the level of each audio signal entered by said input means and generating a level signal corresponding to each audio signal, pitch detecting means for detecting the pitch of each audio signal entered by said input means, voice-formation request signal generating means for generating a voice-formation request signal corresponding to each audio signal if each level signal is greater than a prescribed threshold value and the pitch of each audio signal detected by said pitch detecting means is approximately equal to a prescribed pitch, synthesizing means for synthesizing each audio signal corresponding to each voice-formation request signal generated by said voice-formation request signal generating means, and audio output means for outputting a sound corresponding to the audio signal, which has been synthesized by said synthesizing means, from audio output means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
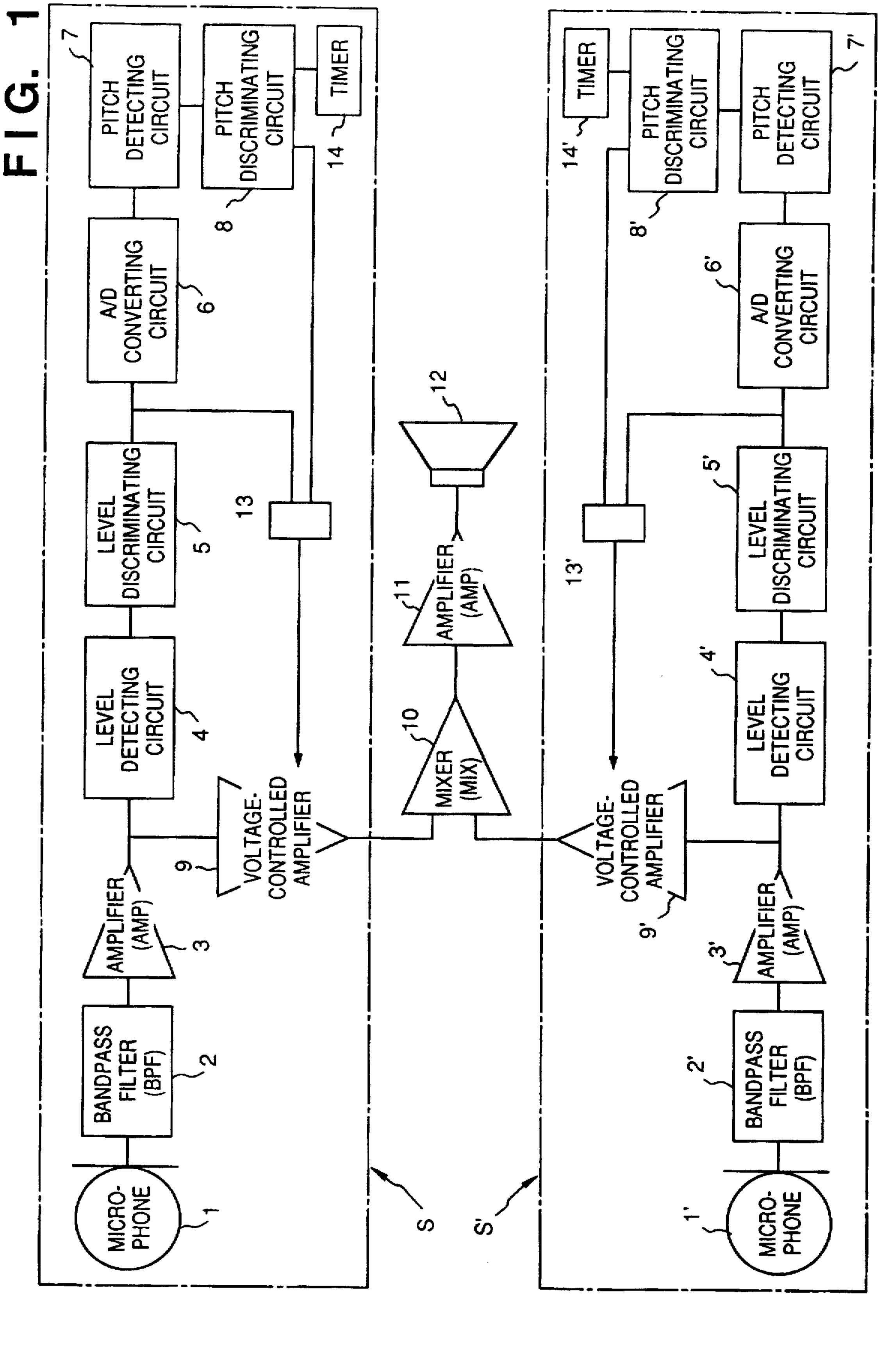
FIG. 1 is a block diagram illustrating the construction of an audio processing system serving as a signal processing system according to a first embodiment of the present invention.

Preferred embodiments of the present invention will now be described in detail in accordance with the accompanying drawings.

The elements of an audio signal processor according to an embodiment of the present invention for attaining the foregoing object will be summarized first.

An audio signal processor according to an embodiment of the invention comprises an input unit for entering an audio signal, a level detector for detecting the level of the audio signal entered from the input unit, a level discriminator for discriminating whether the level detected by the level detector is greater than a threshold value set in advance, a pitch detector for detecting pitch of the audio signal entered from the input unit, and a pitch discriminator for discriminating whether the pitch detected by the pitch detector and a model pitch set in advance agree, wherein output of a signal from the input unit to an audio output unit is on/off-controlled on the basis of results of discrimination performed by the level discriminator and pitch discriminator.

By virtue of this arrangement, the audio processor of this embodiment uses the level detector and pitch detector to respectively detect the level of the audio signal, which enters from the input unit, and pitch, which is one parameter representing tone quality. The audio processor uses the level discriminator to determine whether the level of the input audio signal is greater than the preset threshold value as well as the pitch discriminator to determine whether the above-mentioned pitch agrees with the pitch of the preset model. The audio processor based on the output signals from the level discriminator and pitch discriminator turns on and off the output of the signal from the input unit to the audio output unit. As a result, pick-up of undesirable sounds, which are sounds other than voice signals, can be suppressed and it is possible to determine whether an individual in front of the input unit is currently speaking or whether the audio signal entering via the input unit is a voice or an undesirable sound.

Further, another embodiment according to the invention for attaining the foregoing object includes an input unit for entering an audio signal, an analog-to-digital converter (ADC) for converting an analog signal from the input unit into a corresponding digital signal, first and second memory units for storing, in frame units, the digital signal generated by the ADC, a selector for selecting one of the first and second memory units, a level discriminator for detecting the levels of the signals stored in the first and second memory units and discriminating whether the input signal is valid, a pitch detector for detecting pitch from the signals stored by the first and second memory units, and a counting unit for counting, in frame units, results of discrimination by the level discriminator and results of detection by the pitch detector.

By virtue of this arrangement, the audio processor of this other embodiment uses the ADC to convert the analog signal from the input unit, to which an audio signal is applied, into a corresponding digital signal. The first and second memory units are used by the audio processor to store the digital signal in frame units. The selector is used by the audio processor to select one of the first and second memory units. The level detector is used by the audio processor to detect the levels of the signals stored in the first and second memory units, thereby to determine whether the input signal is valid. The pitch detector is used by the audio processor to detect the pitch of the signals stored in the first and second memory units. The counter is used by the audio processor to count the output of the level detector and the output of the pitch detector in frame units. As a result, it is possible to determine whether an individual in front of the input unit is currently speaking or whether the audio signal entering via the input unit is a voice signal or an undesirable sound.

Embodiments of the present invention will now be described with reference to the accompanying drawings. The present invention is discussed as a plurality of embodiments for descriptive purposes. However, the description of each embodiment can be applied appropriately to the other embodiments as well.

(First Embodiment)

A first embodiment of the invention will now be described with reference to FIGS. 1 through 4. FIG. 1 is a block diagram showing the construction of an audio signal processor according to the first embodiment. In FIG. 1, an audio signal enters from a microphone (input unit) 1 having directivity. The audio signal is applied to a bandpass filter (BPF) 2, which extracts only the voice frequency band (approximately 50 Hz–4 KHz) from the entering audio signal. It should be noted that the BPF can be replaced by a low-pass filter capable of extracting frequencies below 4 KHz. An amplifier (AMP) 3 amplifies the voice signal entering from the filter 2.

A level detecting circuit (level detector) 4 detects the level of the signal applied thereto from the amplifier 3. A level discriminating circuit (level discriminator) 5 determines whether the level of the signal detected by the level detecting circuit 4 is greater than a threshold value set in advance. If the level is found to be greater than the threshold value, then the level discriminating circuit 5 outputs a switch-on signal to turn on a voice-output control switch 13. If the level is equal to or less than the threshold value, the circuit 5 outputs a switch-off signal. An A/D converting (ADC) circuit 6 performs conversion processing to convert the analog audio signal entering from the level discriminating circuit 5 into a digital signal.

On the basis of the switch-on or switch-off signal which enters from the lever discriminating circuit 5 or a pitch discriminating circuit 8, the voice-output control switch 13 generates an on/off control signal, which causes a voltage-controlled amplifier 9 to amplify and output the voice signal, and delivers this control signal to the amplifier 9. On the basis of this on/off control signal, the voltage-controlled amplifier 9 decides whether to amplify and output the voice signal.

A pitch detecting circuit 7 detects the pitch of the signal that enters from the A/D converting circuit 6. The pitch discriminating circuit 8 determines whether the pitch (pitch pattern) of the signal detected by the pitch detecting circuit 7 agrees with the pitch (pitch pattern) of a model set in advance. If the pitches agree, then the pitch discriminating circuit 8 outputs the switch-on signal to the voice-output control switch 13. The pitch of the signal referred to here is the reciprocal of the fundamental frequency (the minimum frequency) of the signal waveform. In other words, the pitch is indicated by the period of the signal waveform. When the switch-on signal is received by the voice-output control switch 13, the switch outputs the on-control signal to the voltage-controlled amplifier 9. Upon receiving the on-control signal as an input, the voltage-controlled amplifier 9, which has a gain adjustment and switch function for voice output, amplifies the voice signal from the amplifier 3 and outputs the amplified voice signal to a mixer 10. Conversely, when the off-control signal is received from the voice-output control switch 13, the voltage-controlled amplifier 9 does not amplify the voice signal from the amplifier 3 and does not produce an output.

The microphone 1, filter 2, amplifier 3, level detecting circuit 4, level discriminating circuit 5, A/D converting circuit 6, pitch detecting circuit 7, pitch discriminating circuit 8, voice-output control switch 13 and voltage-controlled amplifier 9 components construct a first signal processing circuit S. The audio processing system illustrated in FIG. 1 has one more signal processing circuit, hereinafter referred to as a second signal processing circuit S'. The components of the second signal processing circuit S' are identical to those of the first signal processing circuit S, and therefore an apostrophe "'" is attached to the reference numerals of the corresponding components.

The microphones 1, 1' of the first and second signal processing circuits S, S' provide a signal to the mixer (MIX) 10 as described. The latter mixes the audio received from the plurality of microphones 1, 1'. An amplifier 11 amplifies the voice signals mixed by the mixer 10. A speaker (audio output unit) 12 outputs the audio.

The operation of the audio signal processing apparatus having the foregoing construction will now be described. For the sake of convenience, only the first signal processing circuit S will be described. Since the second signal processing circuit S' is identical, this circuit need not be described.

The audio signal enters from the microphone 1 and is passed through the filter 2 to extract only the voice frequency band. The extracted voice signal is amplified by the amplifier 3, after which the level of the amplified signal is detected by the level detecting circuit 4. Next, whether the level of the detected voice signal is greater than the preset threshold value is determined by the level discriminating circuit 5. If the level of the voice signal detected by the level detecting circuit 4 is greater than the threshold value, the switch-on signal is outputted by the level discriminating circuit 5 to the voice-output control switch 13. When the switch-on signal is received by the voice-output control switch 13 the switch 13 outputs the on-control signal to the voltage-controlled amplifier 9. Further, if the level of the voice signal detected by the level detecting circuit 4 is equal to or less than the threshold value, the switch-off signal is output by the level discriminating circuit 5 to the voice-output control switch 13. When the switch-off signal is received by the voice-output control switch 13 the switch 13 outputs the off-control signal to the voltage-controlled amplifier 9.

The first several frames from the moment the level of the voice signal attains the threshold value are referred to as the "onset" of the audio. The analog signal of the level during the period of onset is converted to a digital signal or digitized by the A/D converting circuit 6 for the purpose of audio processing. The pitch of the voice signal is detected by the pitch detecting circuit 7 on the basis of the digitized signal (data), and the pitch discriminating circuit 8 determines whether the detected pitch of the voice signal agrees with the pitch of the model set in advance. If the pitch of the voice signal detected by the pitch detecting circuit 7 agrees with the pitch of the model, then the switch-on signal is sent to the voice-output control switch 13. When the switch-on signal is received by the voice-output control switch 13, the voice-output control switch 13 outputs the on-control signal to the voltage-controlled amplifier 9. Conversely, if the pitch of the voice signal detected by the pitch detecting circuit 7 does not agree with the pitch of the model, then the switch-off signal is sent to the voice-output control switch 13. When the switch-off signal is received by the voice-output control switch 13, the voice-output control switch 13 outputs the off-control signal to the voltage-controlled amplifier 9. On receiving the on-control signal from the voice-output control switch 13, the voltage-controlled amplifier 9, which has the gain adjustment and switch function for voice output, amplifies the voice signal from the amplifier 3 and outputs the amplified voice signal to the mixer 10. Conversely, when the off-control signal is received from the voice-output control switch 13, the voltage-controlled amplifier 9 does not amplify the voice signal from the amplifier 3 and does not produce an output.

Thus, when the on-control signal enters the voltage-controlled amplifier 9, the voice output corresponding to the voice signal that entered from the microphone 1 is eventually output by the speaker 12.

The operation of the audio signal processing apparatus constructed as set forth above will now be described with reference to the flowcharts of FIGS. 2 through 4.

Figure 2:
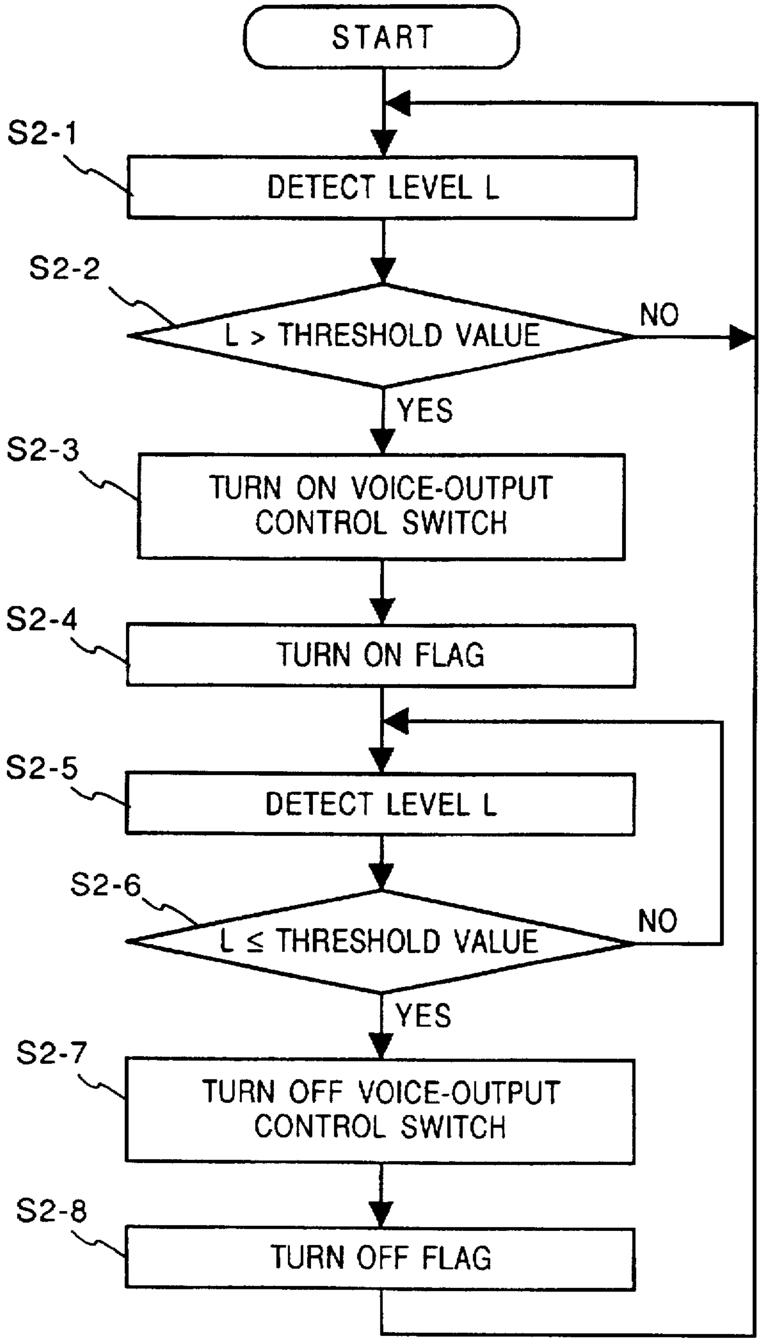
FIG. 2 is a flowchart showing the control procedure of audio processing in this system.

FIG. 2 is a flowchart showing the control procedure of the level detecting circuit 4 and level discriminating circuit 5 in audio processing executed in the audio processing apparatus. FIG. 3 is a flowchart showing the control procedure of pitch detection processing and pitch discrimination processing in the same apparatus. FIG. 4 is a flowchart showing the control procedure of timer interrupt processing in the same apparatus.

First, the control procedure of the level detecting circuit 4 and level discriminating circuit 5 will be described with reference to FIG. 2.

The audio signal enters from the microphone 1, only the voice frequency band is extracted by the filter 2, the extracted voice signal is amplified by the amplifier 3 and the amplified voice signal enters the level detecting circuit 4.

At step S2-1 in FIG. 2, the level detecting circuit 4 receives the amplified voice signal as an input, detects the level L of this voice signal and outputs the level L to the level discriminating circuit 5.

This is followed by step S2-2, at which the level discriminating circuit 5 determines whether the level L of the voice signal detected at step S2-1 is greater than the preset threshold value. If the answer is "NO", then the program returns to step S2-1. If the level L of the voice signal is greater than the threshold value, then the switch-on signal is outputted to the voice-output control switch 13.

Next, at step S2-3, the voice-output control switch 13 responds to input of the switch-on signal by outputting the on-control signal to the voltage-controlled amplifier 9.

Next, at step S2-4, a flag (not shown) indicating that the individual in front of the microphone 1 is currently speaking is turned on.

The level detecting circuit 4 again detects the level L of the voice signal at step S2-5.

This is followed by step S2-6, where the level discriminating circuit 5 determines whether the level L of the voice signal detected at step S2-5 is equal to or less than the threshold value, thereby detecting the offset of the voice signal level. If the level L of the voice signal is not equal to or less than the threshold value, the program returns to step S2-5. On the other hand, if the level L of the voice signal is equal to or less than the threshold value, then the switch-off signal is outputted to the voice-output control switch 13.

At step S2-7, the voice-output control switch 13 receives the input of the switch-off signal and outputs the off-control signal to the voltage-controlled amplifier 9.

The above-mentioned flag is turned off at step S2-8 and the program returns to step S2-1.

Figure 3:
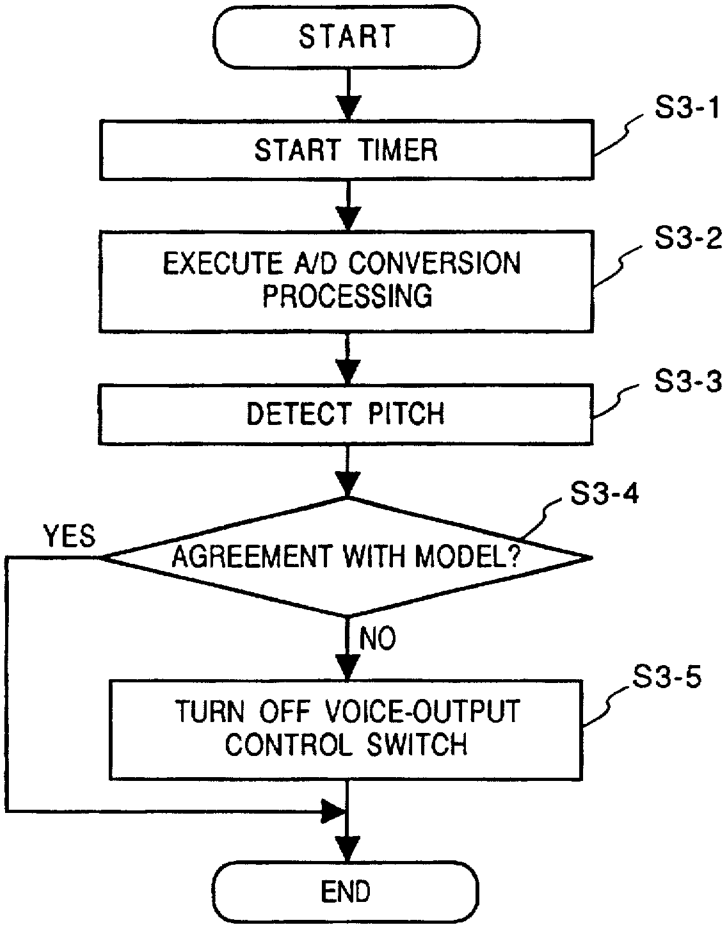
FIG. 3 is a flowchart showing the control procedure of pitch detection and pitch discrimination processing in this system.
Figure 4:
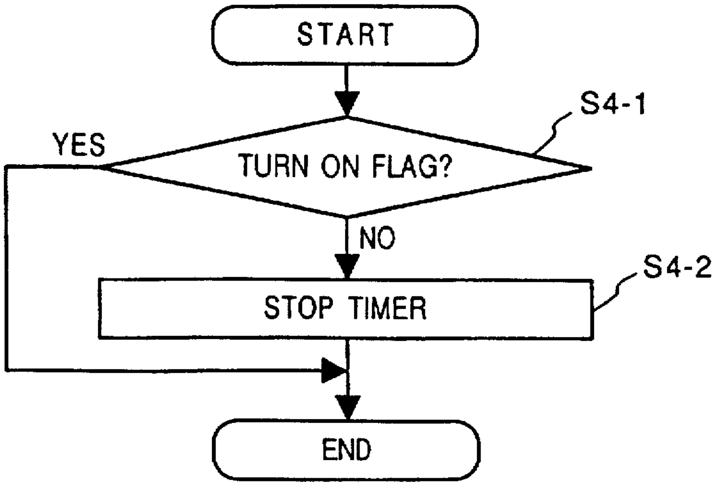
FIG. 4 is a flowchart showing the control procedure of timer interrupt processing in this system.

In concurrence with the processing of FIG. 2 described above, pitch detection processing and pitch discrimination processing are executed in accordance with the control procedure shown in FIG. 3. The processing of FIG. 3 is executed utilizing a length of time of several frames from the moment onset is detected at step S2-2 in FIG. 2. The control procedure of pitch detection processing and pitch discrimination processing will be described with reference to FIG. 3.

The pitch discriminating circuit 8 starts a timer 14 at step S3-1. The timer 14 measures elapse of a prescribed time periodically and sends the pitch discriminating circuit 8 an interrupt-request signal when the prescribed time elapses. The pitch discriminating circuit 8 responds by starting an interrupt processing routine illustrated in FIG. 4. When the interrupt processing routine is started by the interrupt-request signal, this routine checks whether the above-mentioned flag is ON or not, i.e., whether the voice issuance interval has ended. If the flag is OFF, the operation of the timer is halted. If the flag is ON, measurement of elapse of the prescribed time is allowed to continue. FIG. 4 illustrates the details of interrupt processing. Specifically, it is determined at step S4-1 whether the flag is ON or not. If the flag is ON, no action is taken and the processing operation is terminated. If the flag is OFF, on the other hand, the timer is stopped at step S4-2, after which the processing operation is halted.

At step S3-2 in FIG. 3, the A/D converting circuit 6 samples the voice signal input from the level discriminating circuit 5 in frame units and converts the signal to a digital signal. Here the input voice signal is the voice signal outputted by the amplifier 3 via the level detecting circuit 4 and level discriminating circuit 5.

The pitch detecting circuit 7 detects the pitch of the voice signal at step S3-3. Next, at step S3-4, the pitch discriminating circuit 8 determines whether the pitch of the voice signal detected at step S3-3 agrees with the pitch of the preset model. This processing operation is terminated if agreement is found. If there is no agreement, the switch-off signal is outputted to the voice-output control switch 13.

The voice-output control switch 13 receives the input of the switch-off signal and outputs the off-control signal to the voltage-controlled amplifier 9 at step S3-5. The voltage-controlled amplifier 9 responds to the input of the off-control signal by halting the output of the voice signal.

An example of a method of detecting the pitch of a voice signal executed at step S3-3 is to perform detection by taking the autocorrelation of a residual signal obtained by the linear prediction method. Another example is to find a peak value in approximate terms from the envelope of a spectrum.

The above-described method of controlling audio output may be summarized as follows: When analog processing is used for discrimination, too much time is required and there is an attendant time delay. Accordingly, the switch is provided for outputting the control signal that turns the operation of the voltage-controlled amplifier 9 on and off. Initially, the switch is turned ON or OFF based upon whether the level of the voice signal is greater than the threshold value. Thus, if the pitch of the voice signal and the pitch of the model agree, the switch is turned ON. Otherwise, the switch is turned OFF. In this way the voice-signal output operation of the voltage-controlled amplifier 9 is controlled.

Though the voice-output control switch 13 performs on/off control based on signals from both the level discriminating circuit 5 and pitch discriminating circuit 8, the switch 13 may be an AND gate. That is, it should be readily understood that when the results of discrimination performed by both the level discriminating circuit 5 and pitch discriminating circuit 8 request the ON operation of the voltage-controlled amplifier 9, an AND operation may be performed to output the on-control signal requesting the ON operation of the voltage-controlled amplifier 9.

Thus, in accordance with the embodiment as described above, it is possible to readily suppress pick-up of undesirable sounds, namely sounds other than a voice, from a microphone.

(Second Embodiment)

A second embodiment of the invention will now be described with reference to FIG. 5. This embodiment is so adapted as to control changeover of video cameras based upon whether the pitch of a voice signal agrees with the pitch of a model set in advance.

Figure 5:
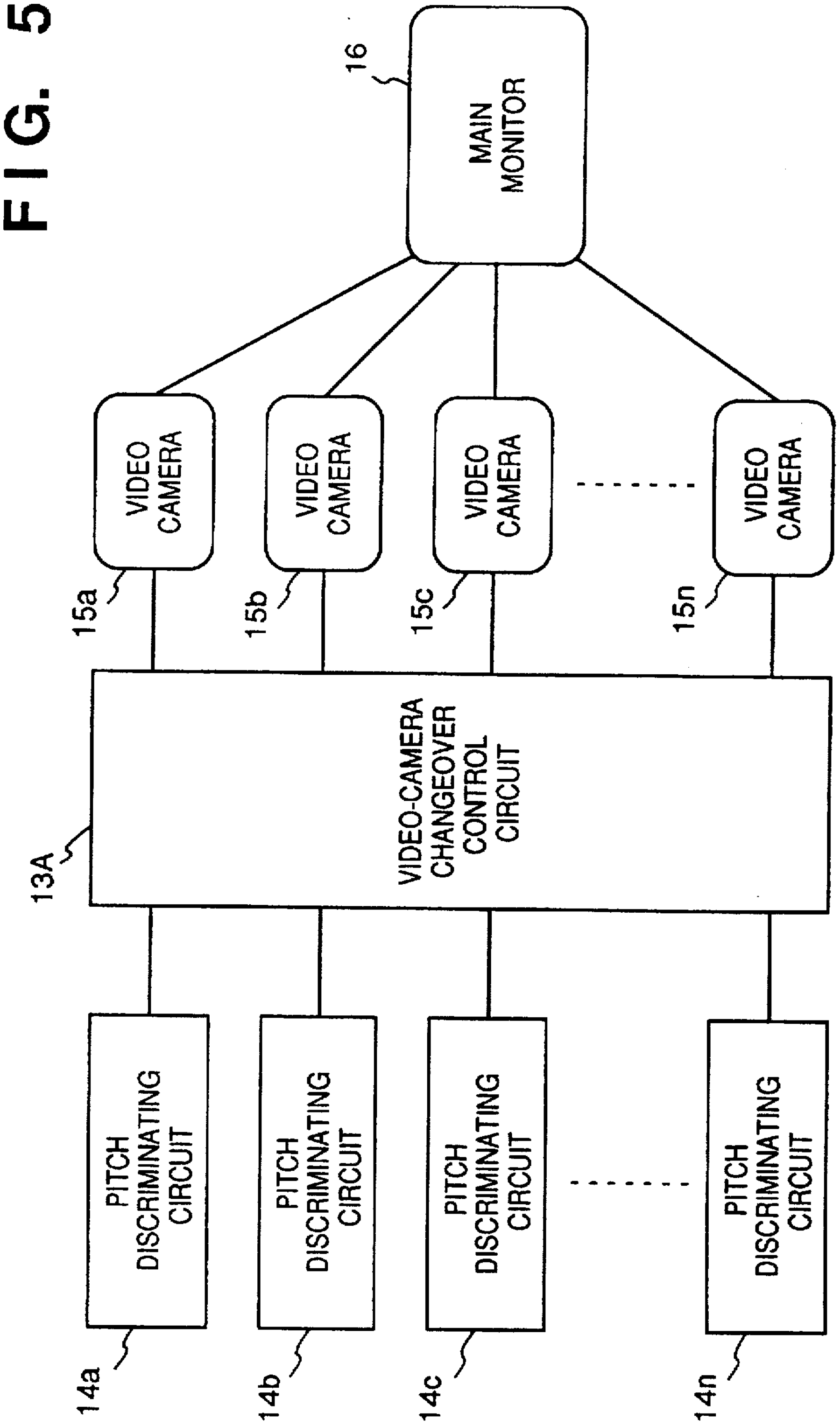
FIG. 5 is a block diagram showing an arrangement in which a signal processor according to a second embodiment of the invention is applied to a video-camera changeover control system.

FIG. 5 is a block diagram showing an arrangement in which a signal processor according to a second embodiment of the invention is applied to a video-camera changeover control system. In FIG. 5, numeral 13A denotes a video-camera changeover control circuit to the input side of which are connected a plurality of pitch (pitch-pattern) discriminating circuits 14*a*, 14*b*, 14*c*, . . . 14*n*. These pitch discriminating circuits 14*a*, 14*b*, 14*c*, . . . 14*n* have a function similar to that of the pitch discriminating circuits 8, 8' in FIG. 1 of the first embodiment described above. A pitch detecting circuit similar to the pitch detecting circuits 7, 7' in FIG. 1 of the first embodiment is connected to the input side of each of these pitch discriminating circuits.

Further, a plurality of video cameras 15*a*, 15*b*, 15*c*, . . . 15*n* corresponding to the pitch discriminating circuits 14*a*, 14*b*, 14*c*, . . . 14*n* are connected to the output side of the video-camera changeover control circuit 13A. The output side of each of the video cameras 15*a*, 15*b*, 15*c*, . . . 15*n* is connected to a main monitor 16.

In the above-described arrangement, the pitch discriminating circuits 14*a*, 14*b*, 14*c*, . . . 14*n* determine whether the pitches of the voice signals detected by the pitch detecting circuits agree with the pitch of the above-mentioned model set in advance, just as in the first embodiment. When the detected pitch of the voice signal agrees with the pitch of the model, the pitch discriminating circuit that has determined this agreement sends a control signal to the video-camera changeover control circuit 13A, whereby the image captured by the video camera corresponding to the pitch discriminating circuit 14*a*, 14*b*, 14*c* . . . 14*n* that has determined agreement is displayed on the screen of the main monitor 16.

A situation may arise in which a plurality of individuals are speaking simultaneously. By providing a control protocol according to which video cameras are changed over in such a manner that the individual who starts speaking first appears on the screen of the main monitor 16, the video cameras 15*a*, 15*b*, 15*c*, . . . 15*n* can be changed over in an effective manner.

In this embodiment, an example is illustrated in which a video camera that transfers the image displayed on the main monitor is selected based upon the pitch of sound. However, it should be understood that that the selection can be made based upon both the level and pitch of sound, as described in the first embodiment.

Thus, in accordance with the second embodiment as described above, the signal indicative of the result of the discrimination operation performed by the pitch discriminating circuit is employed as a control signal in controlling the changeover of the video cameras. This makes it possible to prevent erroneous operation of video cameras from reaction to undesirable sounds such as reverberation.

(Third Embodiment)

Figure 6:
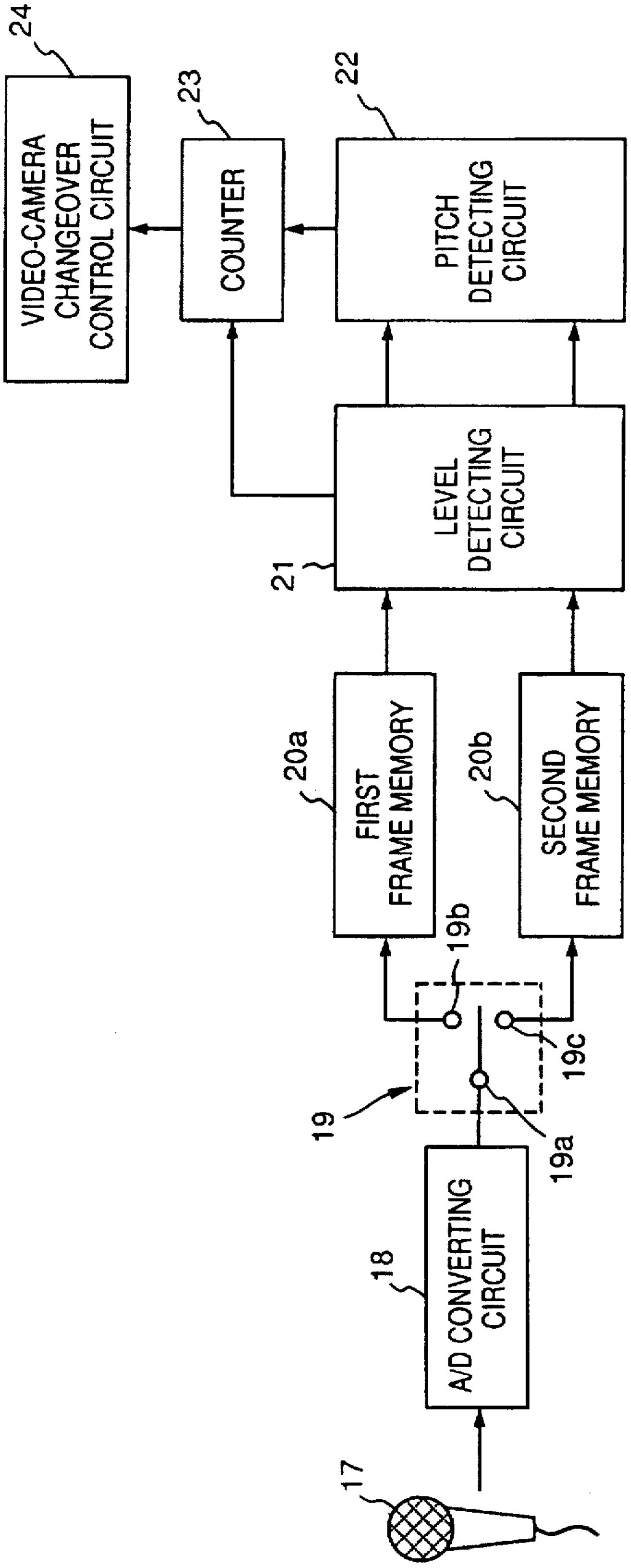
FIG. 6 is a block diagram showing the construction of a signal processor according to a third embodiment of the invention.

A third embodiment of the invention will now be described with reference to FIGS. 6 through 8. FIG. 6 is a block diagram illustrating the construction of an image signal processor according to a third embodiment of the invention. Numeral 17 denotes a microphone (input unit) having directivity. An audio signal enters from the microphone 17 and is applied to an A/D converting circuit 18, which converts the input analog audio signal into a digital signal. The output side of the A/D converter 18 is connected to a first frame memory (first memory unit) 20*a* and a second frame memory (second memory unit) 20*b* via a changeover switch (selector) 19.

The first and second frame memories 20*a*, 20*b* store the signal, which has been digitized by the A/D converting circuit 18, in blocks of 20 msec, for example. The changeover switch 19, which is for selecting between the first and second frame memories 20*a*, 20*b*, has one movable contact 19*a* and two fixed contacts 19*b*, 19*c*. Data is capable of being stored in the first frame memory 20*a* by connecting the movable contact 19*a* to one fixed contact 19*b* and in the second frame memory 20*b* by connecting the movable contact 19*a* to the other fixed contact 19*c*.

The output side of each of the first and second frame memories 20*a*, 20*b* is connected to a level detecting circuit (level detector 21). The latter detects the levels of the signals in the frame memories 20*a*, 20*b* and determines whether the particular signal is valid or not based upon the detected level. The output side of the level detecting circuit 21 is connected to the input side of a pitch detecting circuit 22. The latter detects the pitch components in the signals stored in the first and second frame memories 20*a*, 20*b*.

Pitch in this embodiment is assumed to represent a frequency component of more than 3 msec and less than 15 msec in the input signal that enters from microphone 17.

The detection signal from the level detecting circuit 21 and the detection signal from the pitch detecting circuit 22 enter a counter (counting unit) 23. The counter 23 comprises a pitch counting section for recording the pitch count and a frame counting section for counting the number of frames. The count signal from the counter 23 is input to a video-camera changeover control circuit 24. The latter controls changeover of the video cameras in such a manner that a video camera will point in the direction of the microphone 17 that has picked-up the voice of the individual located in front of that microphone.

The operation of the image processor having the foregoing construction will now be described. First, when an audio signal is picked-up by the microphone 17, the signal is digitized by the A/D converting circuit 18, whereby frames are sampled. The sampling frequency is 8 KHz and the sample data (signal) is stored initially in the first frame memory 20*a*. When storage of 20 msec of data in the first frame memory 20*a* ends, level detection processing is executed by the level detecting circuit 21. At the same time, the changeover switch 19 is changed over to allow storage in the second frame memory 20*b* so that 20 msec of the sampled signal is stored in the second frame memory 20*b*.

The level detecting circuit 21 takes the mean value of the level data stored in the first frame memory 20*a* (or second frame memory 20*b*) and judges that the data in the first frame memory 20*a* (or second frame memory 20*b*) is valid data when the mean value exceeds a threshold value decided based upon experience (the threshold value varies depending upon the environment). The pitch detecting circuit 22 then perform pitch detection processing. Pitch detection processing includes performing a linear prediction using the input signal, obtaining a prediction error between the predicted value and the value of the input signal and obtaining pitch by taking the autocorrelation of the prediction error. While pitch is detected by thus performing pitch detection processing, the number of frames is counted by the counter 23.

Thus, pitch detection processing is applied to the data in each of the frame memories 20*a*, 20*b*. When the count recorded by counter 23 reaches a value of two, it is judged that the input signal is the voice of the individual in front of the microphone 17 and the video-camera changeover control circuit 24 places its control switch (not shown) in the ON state. After the count in counter 23 attains a value of one, the count in the counter 23 is cleared to zero, and processing is resumed, when a level is not detected for 300 msec (15 frames) or when a level is detected but pitch is not.

In the case where level is not detected, this means that there is no input signal. In the case where level is detected but pitch is not, this means that what has been detected is noise. In either case, the count in counter 23 is not updated and therefore the aforementioned control switch remains in the OFF state and the status of the video cameras is not altered by the video-camera changeover control circuit 24.

Next, the control operating procedure performed after the digitizing processing by the A/D converting circuit 18 of the image processor having the foregoing construction will be described with reference to the flowcharts of FIGS. 7 and 8.

First, at step S7-1, the pitch counting section and frame counting section of the counter 23 are initialized. The pitch counting section is for counting the number of frames in which pitch is detected. The frame counting section is for counting the number of frames in which pitch is not detected between the first frame in which pitch is detected and the second frame in which pitch is detected next.

Next, at step S7-2, the sampled signal is stored in the first frame memory 20*a*. Then, at step S7-3, level detection processing is applied to the signal stored in the first frame 20*a* at step S7-2. In concurrence with the processing executed at step S7-3, the changeover switch 19 is switched over, at step S7-15, to the state in which data can be stored in the second frame memory 20*b*. This is followed by step S7-16, at which the sampled signal is stored in the second frame memory 20*b*.

After step S7-3 is executed, the program proceeds to step S7-4, at which level detection processing is executed. Specifically, it is determined whether the level of the signal stored in the first frame memory 20*a* has exceeded the predetermined threshold value. If the threshold value is exceeded, the program proceeds to step S7-5, at which pitch detection processing is applied to the signal stored in the first frame memory 20*a*. Whether pitch has been detected or not is determined at step S7-6. If pitch is detected, the count pc in the pitch counting section of the counter 23 is incremented (to pc+1) and the count fc in the frame counting section is cleared to zero (fc=0) at step S7-7.

The program then proceeds to step S7-8, at which it is determined whether the count pc in the pitch counting section is two or not. If pc is equal to two, then it is judged that the input signal is a voice and the control switch of the video-camera changeover control circuit 24 is turned ON at step S7-9, after which the program proceeds to the processing routine of FIG. 8. If pc is not equal to 2, then continue on to the processing routine of FIG. 8.

Figure 7:
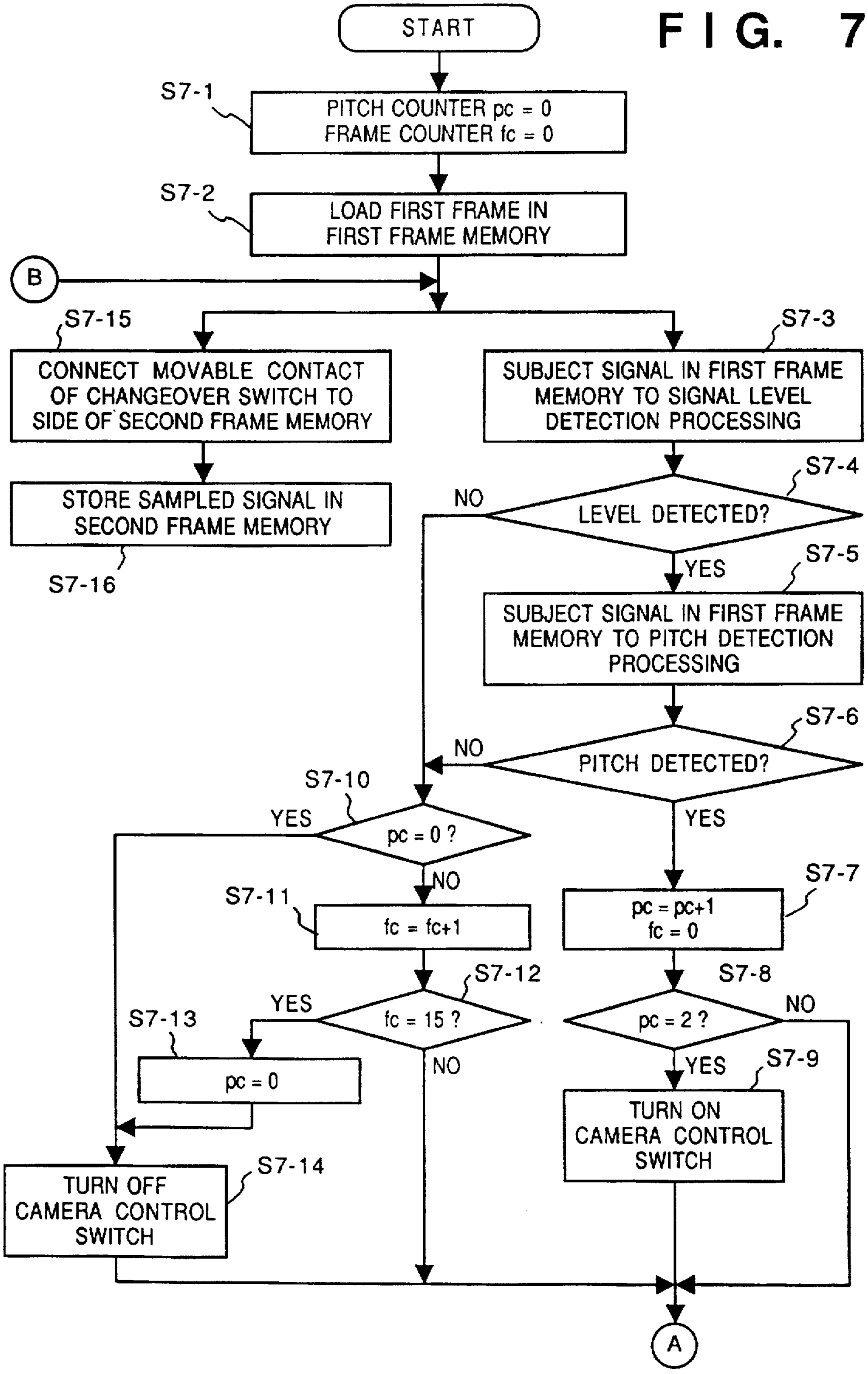
FIG. 7 is a flowchart showing the operation of this signal processor.
Figure 8:
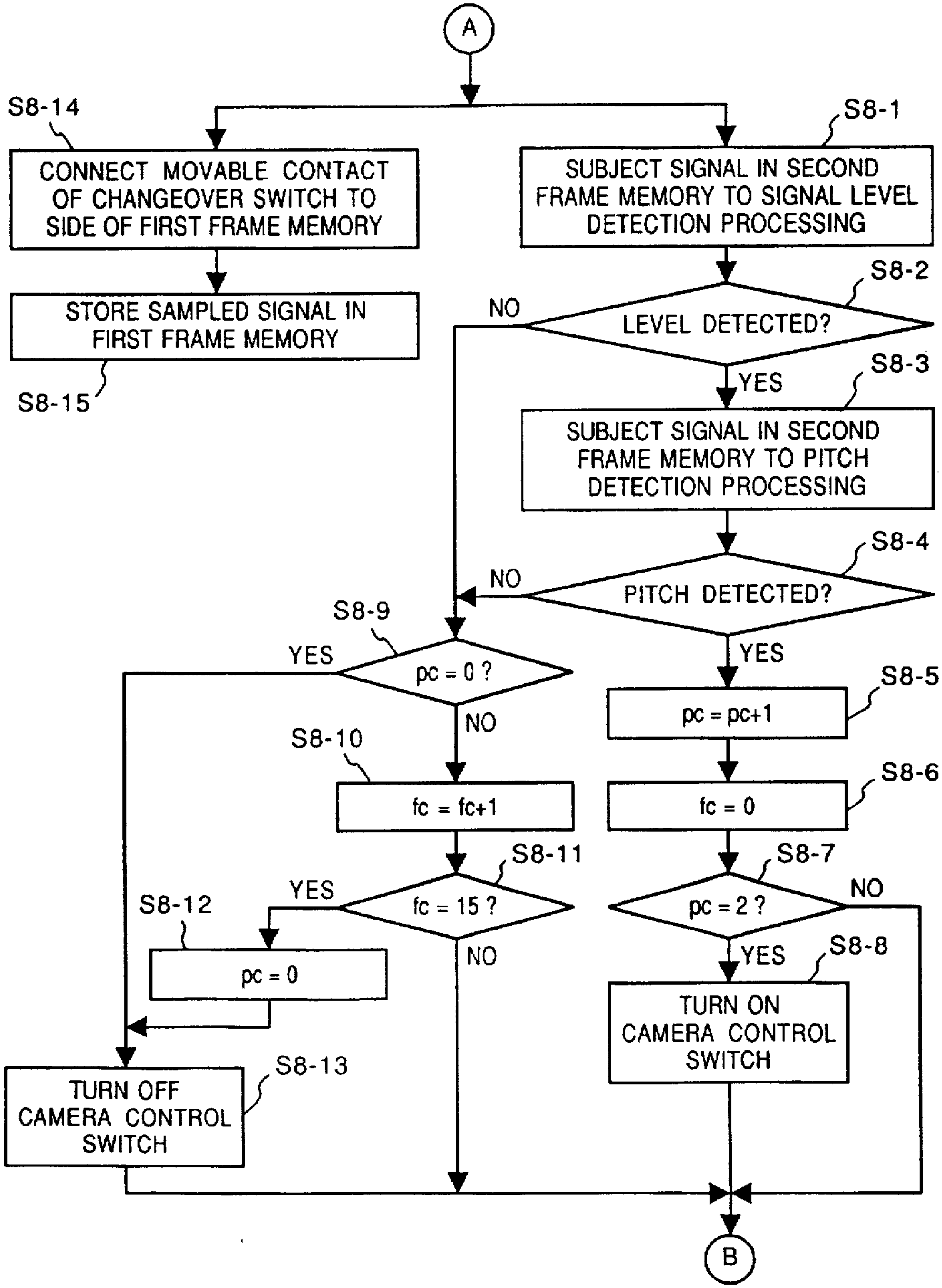
FIG. 8 is a flowchart showing the operation of this signal processor.

In a case where a level is not detected at step S7-4 in FIG. 7, the program proceeds to step S7-10, at which it is determined whether the count pc in the pitch counting section of the counter 23 is zero or not. In a case where pc is zero, the control switch of the video-camera changeover control circuit 24 is turned OFF at step S7-13, after which the program proceeds to the processing routine of FIG. 8. In a case where the count pc in the pitch counting section is not zero, the count fc in the frame counting section is incremented (to fc+1) at step S7-11, since pitch was detected in the immediately preceding frame. Thus, after the pitch of the above-mentioned first frame is detected, frames are counted during the interval which extends up to the moment pitch is detected the second time, i.e., until pitch of the second frame is detected.

The program proceeds from step S7-11 to step S7-12, at which it is determined whether the number of frames (the count fc recorded by the frame counting section) in the above-mentioned interval is 15 (300 msec) or not. If the count fc in the frame counting section is 15, then fc is cleared to zero at step S7-13, after which the program proceeds to step S7-14. Here the control switch of the video-camera changeover control circuit 24 is turned OFF, after which the program proceeds to the processing routine of FIG. 8. If the count fc in the frame counting section is not 15, no processing is executed and the program proceeds to the processing routine of FIG. 8.

The processing routine of FIG. 8 will now be described.

First, at step S8-1, the signal that has been stored in the second frame memory 20*b* is subjected to level detection processing. Then, at step S8-2, it is determined whether a level has been detected in accordance with the above-described criteria. In concurrence with the processing of step S8-1, the changeover switch 19 is switched over to the state in which data can be stored in the first frame memory 20*a* at step S8-14. This is followed by step S8-15, at which the sampled signal is stored in the first memory 20*a*.

If a level is detected at step S8-2, then the program proceeds to step S8-3, at which pitch detection processing is applied to the signal that has been stored in the second frame memory 20*b*. Thereafter, it is determined at step S8-4 whether pitch has been detected. If pitch has been detected, then the count pc in the pitch counting section of the counter 23 is incremented (to pc+1) and the count fc in the frame counting section is cleared to zero (fc=0).

Next, the program proceeds to step S8-7, at which it is determined whether the count pc in the pitch counting section is two or not. If the count is equal to two, then it is judged that the input signal is a voice and the control switch of the video-camera changeover control circuit 24 is turned ON at step S8-8, after which a transition is made to step S7-3 in FIG. 7.

If a level is not detected at step S8-2, then the program proceeds to step S8-9, at which it is determined whether the count pc in the pitch counting section of the counter 23 is zero or not. If pc is found to be zero, then the control switch of the video-camera changeover control circuit 24 is turned OFF at step S8-13, after which a transition is made to step S7-3 in FIG. 7. In a case where the count pc in the pitch counting section is not zero, the count fc in the frame counting section is incremented (to fc+1) at step S8-10, since pitch was detected in the immediately preceding frame. Thus, after pitch of the above-mentioned first frame is detected, frames are counted in the interval which extends up to the moment pitch is detected the second time, i.e., until pitch of the second frame is detected.

The program proceeds to step S8-11, at which it is determined whether the number of frames (the count fc recorded by the frame counting section) in the above-mentioned interval is 15 (300 msec) or not. If the count fc in the frame counting section is 15, then fc is cleared to zero at step S8-12, after which the program proceeds to step S8-13. Here the control switch of the video-camera changeover control circuit 24 is turned OFF, after which a transition is made to step S7-3 of FIG. 7. If the count fc in the frame counting section is not 15, no processing is executed and a transition is made to step S7-3 of FIG. 7.

Thus, in accordance with this embodiment as described above, whether or not the input signal is undesirable sound such as noise is determined based upon results of discrimination performed by both the level detecting circuit 21 and the pitch detecting circuit 22. Accordingly, discrimination processing is executed in a highly reliable manner. Further, since the control switch of the video-camera changeover control circuit 24 is turned on and off based upon the results of discrimination mentioned above, it is possible to prevent video cameras from operating erroneously by reacting to undesirable sounds, namely sounds other than a voice.

In other words, the pick-up of undesirable sounds, namely sounds other than a voice, can be suppressed with assurance and it is possible to readily discriminate whether an individual in front of an input means is currently speaking or whether an audio signal that has entered via the input means is a voice or some undesirable sound.

(Fourth Embodiment)

An audio processing apparatus according to a fourth embodiment of the invention will be described in detail. First, the main points of the audio signal processing apparatus according to the fourth embodiment will be summarized.

The apparatus according to the fourth embodiment comprises a level detector for detecting the level of an input audio signal and outputting a portion of the signal above a prescribed level, an A/D converter for converting the analog audio signal outputted by the level detector into a digital signal, an audio signal memory for storing the digital audio signal outputted by the A/D converter, and a voice discriminator for detecting periodicity of the digital audio signal stored in the audio signal memory and discriminating whether the audio signal is indicative of a human voice or not depending upon whether the detected periodicity falls within a prescribed range.

The voice discriminator includes an autocorrelation arithmetic unit for calculating autocorrelation of input audio data, a maximum detector for detecting a prescribed maximum point from an autocorrelation function obtained by the autocorrelation arithmetic unit, a centroid-value arithmetic unit for calculating a centroid value within a prescribed period of time and correlation value of the maximum point detected by the maximum detector, and a discriminator for discriminating whether the input audio data is a voice or not based upon a time component and correlation-value component of the centroid value obtained by the centroid-value arithmetic unit.

The audio signal processing apparatus of the fourth embodiment will now be described in detail with reference to the drawings.

Figure 9:
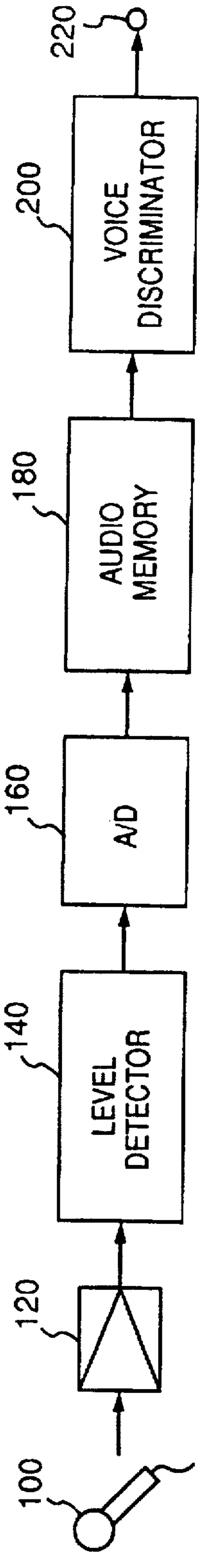
FIG. 9 is a simplified block diagram of the third embodiment.

FIG. 9 is a block diagram of a signal processing according to the fourth embodiment. Shown in FIG. 9 are a microphone 100, a preamplifier 120 for amplifying the output of the microphone 100, a level detecting circuit 140 for detecting the level of the audio signal outputted by the preamplifier 120 and delivering an input signal which exceeds a prescribed level, an A/D converter 160 for converting the analog output of the level detecting circuit 140 into a digital signal, an audio data memory circuit 180 for storing digital audio data outputted by the A/D converter 160, a voice discriminating circuit 200 for determining whether the audio data outputted by the audio data memory circuit 180 is voice data or not, and an output terminal 220 for delivering externally the results of discrimination performed by the voice discriminating circuit 200.

The operation of the circuitry shown in FIG. 9 will now be described. The audio signal outputted by the microphone 100 is amplified by the preamplifier 120 and then fed into the level detecting circuit 140. The latter compares the input audio signal with a prescribed reference level and provides the A/D converter 160 with the portion of the signal above the prescribed reference level. The A/D converter 160 converts the analog output of the level detecting circuit 140 into a digital signal. A prescribed interval of the resulting digital signal output is stored in the audio memory circuit 180. The voice discriminating circuit 200 detects the periodicity of the audio data stored in the audio data memory circuit 180, discriminates whether the input audio data is that of a human voice based upon the fundamental period detected and outputs the results of discrimination to the output terminal 220.

Figure 10:
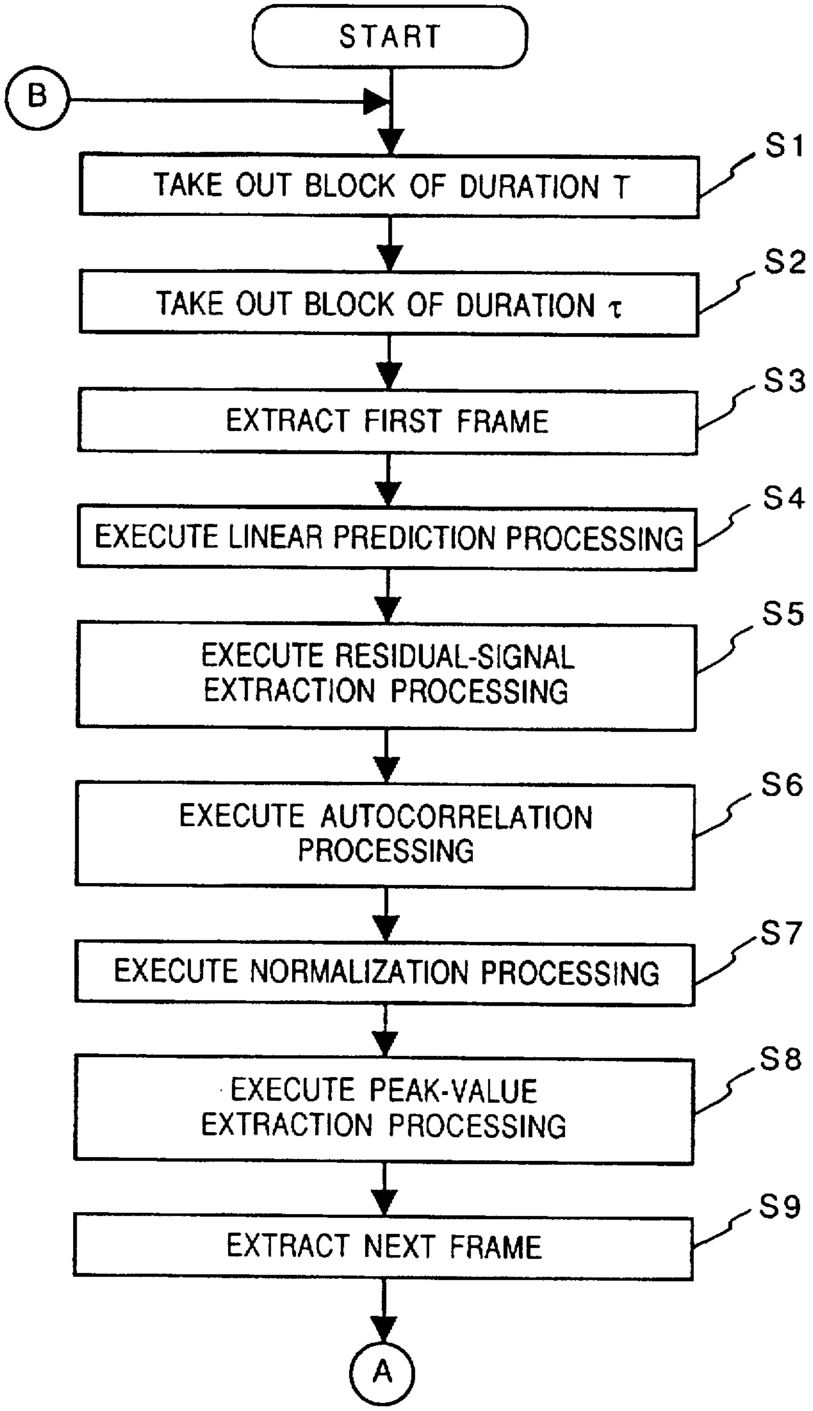
FIG. 10 is a flowchart of voice discrimination processing according to the third embodiment.
Figure 11:
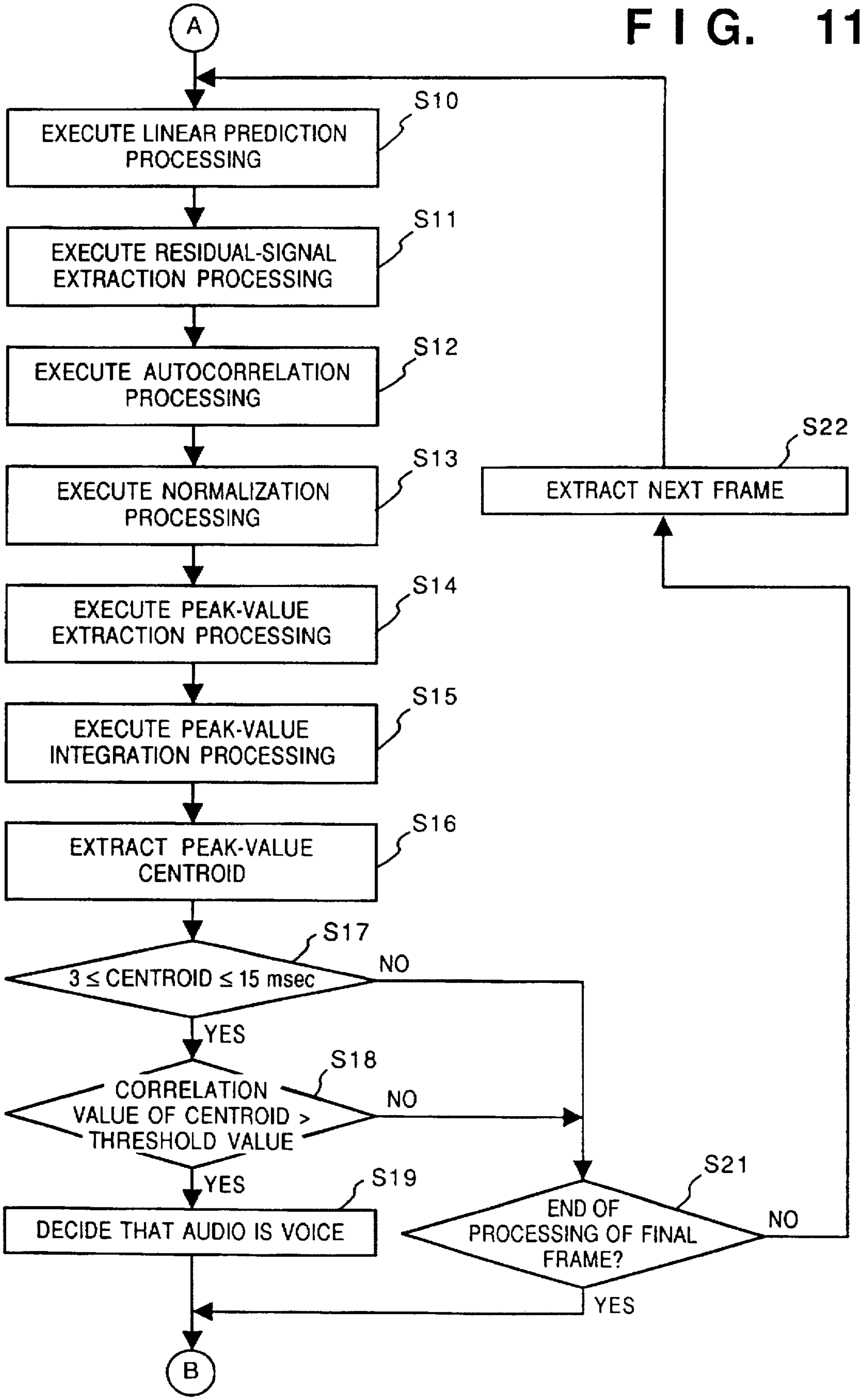
FIG. 11 is a flowchart of voice discrimination processing according to the third embodiment.

FIGS. 10 and 11 are flowcharts illustrating the flow of voice discrimination processing executed by the voice discriminating circuit 200. First, at step S1, a block of a duration T is taken from the audio data stored in the audio data memory circuit 180 and then a frame of duration t is taken from the block of duration T at step S2.

Figure 12:
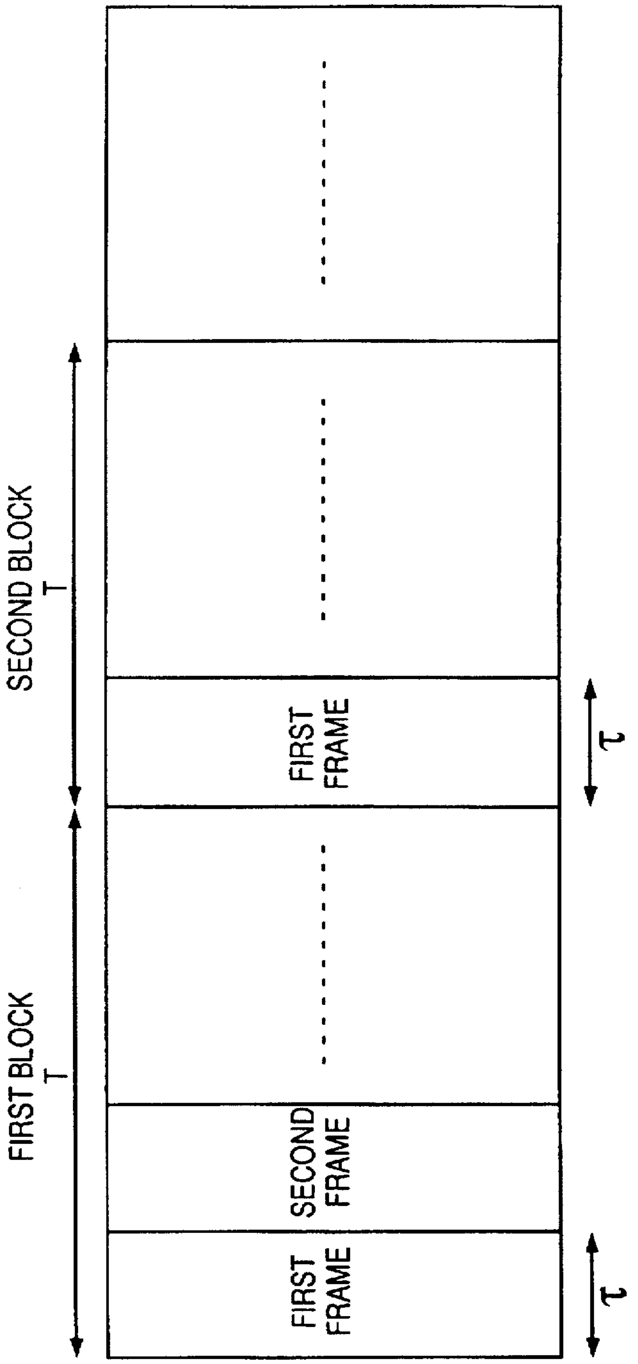
FIG. 12 is a diagram showing the relationship between a frame (time duration t) and a block (time duration T) of audio data accumulated in a memory circuit.

The relationship between T and t is illustrated in FIG. 12. Hereinafter the interval whose unit of measurement is the duration t shall be referred to as frame, while the interval whose unit of measurement is the duration T shall be referred to as a block.

Next, the first frame of the first block is extracted from the audio data stored in the memory circuit 180 (step S3), then a linear prediction is made from the audio data in this frame (step S4). More specifically, if we let $S_t$ represent the original signal and $S_{tp}$ the predicted signal, then an equation for performing the linear prediction using the past N samples will be given as follows:

$$S_{tp}=-(a_1S_{t-1}+a_2S_{t-2}+a_3S_{t-3}+\ldots+a_NS_{t-N})$$

Next, the difference $E_t$ between the original signal $S_t$ and the predicted signal $S_{tp}$ is obtained (step S5). That is, the following operation is performed:

$$Et=St-Stp$$

Furthermore, autocorrelation processing for viewing the periodicity of the original signal is executed (step S6). In this embodiment, an autocorrelation function is written as follows in order to express the extent to which components up to the period t exist:

$$R(\tau)=\sum_{t=0}^{T-1-\tau}E_tE_{t+\tau}$$

$$\tau\in\{0, 1, \ldots, T-1\}$$

Next, the autocorrelation function obtained at step S6 is normalized (step S7). That is, an operation given by the following equation is executed, in which Rn represents the normalized autocorrelation function:

$$Rn(t)=R(t)/R(0)$$

Figure 13:
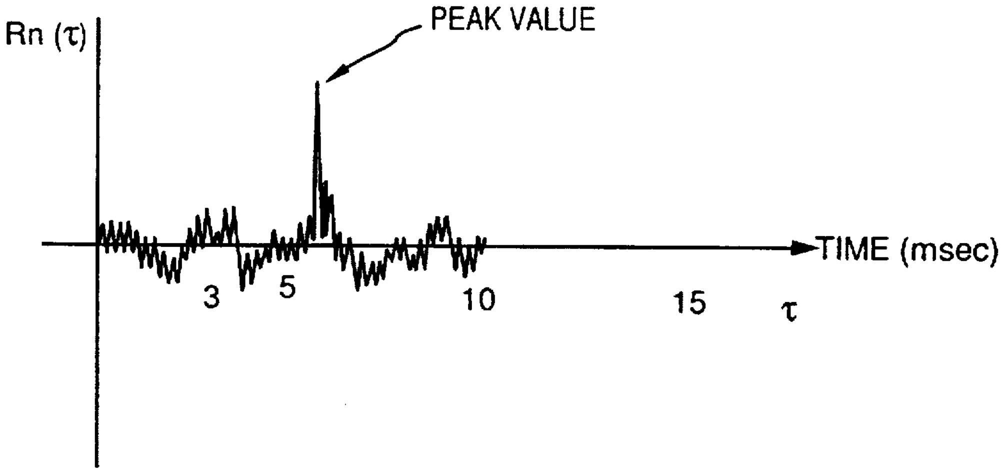
FIG. 13 is a diagram showing an example of an autocorrelation function.
Figure 14A:
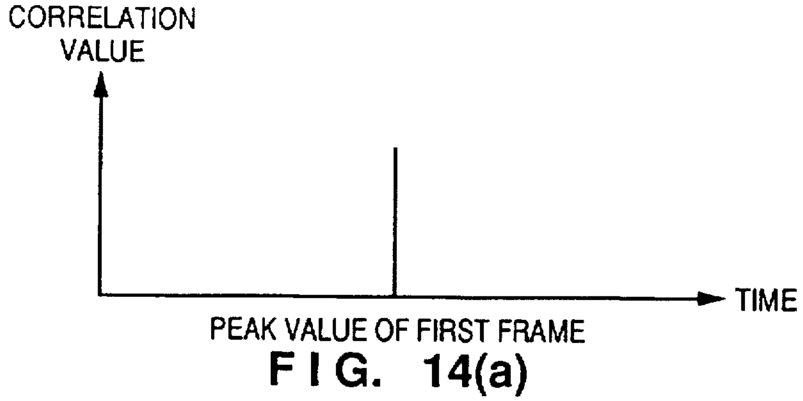
FIGS. 14(*a*)–14(*d*) are diagrams showing integration of peak values of an autocorrelation function and the time component of a centroid of the peak values.
Figure 14B:
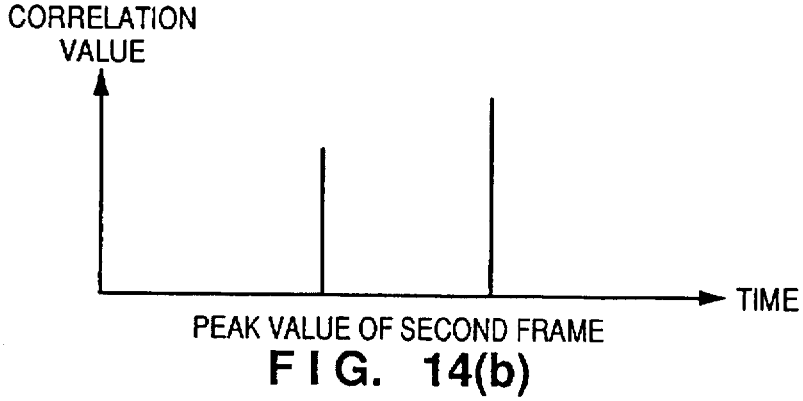
Figure 14C:
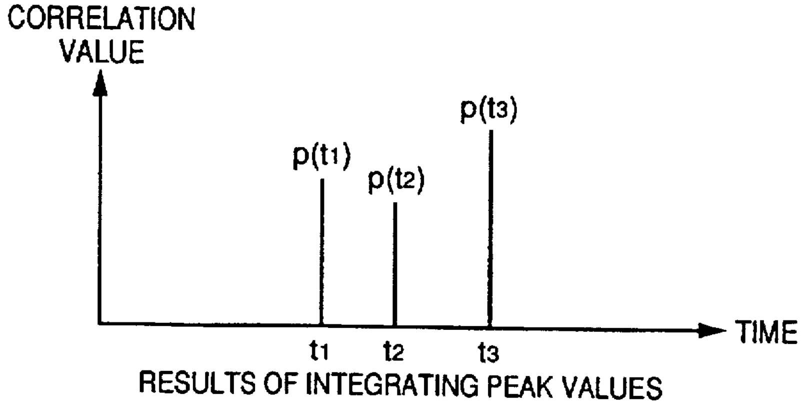
Figure 14D:
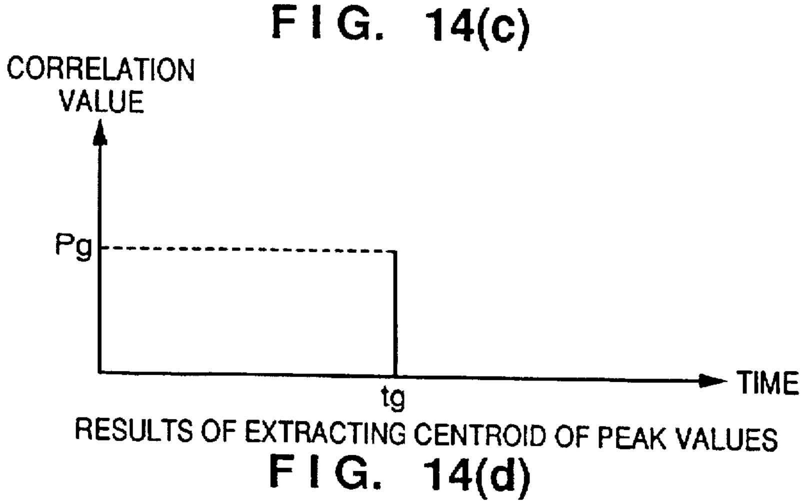

This autocorrelation function is illustrated in FIG. 13, in which t is plotted along the horizontal axis and the value of the normalized autocorrelation function Rn(t) is plotted along the vertical axis.

Next, whether the correlation value normalized at step S7 possesses a peak value which exceeds a threshold value decided based upon experience is detected and this peak value is extracted (step S8). As a result of this processing, the portion indicated by the arrow in the example of FIG. 13 is extracted.

The processing of the first frame of the first block is as described above. Next, the second frame of the first block is extracted and processing (steps S10~S14) the same as that of steps S4~S8 of the first frame is executed to extract the peak value of the value of the autocorrelation function Rn(t) in the second frame.

Processing for integrating these peak values is executed at step S15, and the centroid of the peak values is obtained at step S16 from the peak value extracted in the first frame, the peak values extracted in the second frame and the result of integrating these peak values.

A method of processing for extracting the centroid of peak values will now be described in detail with reference to FIGS. 14(*a*)–14(*d*). FIG. 14(*a*) indicates the peak value of the autocorrelation function obtained in the first frame, and FIG. 14(*b*) indicates peak values of the autocorrelation obtained in the second frame. The result (step S15) of integrating these peak values is as shown in FIG. 14(*c*). As shown in FIG. 14(*c*), the peaks are labeled $t_1$, $t_2$ and $t_3$ in ascending order in terms of time. Further, the centroid value is obtained as shown below, where the correlation values at this time are represented by $p(t_1)$, $p(t_2)$ and $p(t_3)$, respectively. Specifically, letting $m_{op}$ represent the moment of order 0 of the autocorrelation function, we have $$m_{op}=\sum_{i=1} p(t_i)$$

Further, letting $m_{ot}$ represent the moment of order 0 of time, we have $$m_{ot}=\sum_{i=1} t_i$$

Furthermore, letting $m_1$ represent the moment of the first order of time, we have $$m_1=\sum_{i=1} t_i p(t_i)$$

From these equations, the centroid value g of time is written as follows:

$$t_g=m_1/m_{op}$$

On the other hand, the centroid value $p_g$ of the correlation values is obtained by performing the calculation $$p_g=m_1/m_{ot}$$

The centroid value obtained is as shown in FIG. 14(*d*).

It is determined whether the time component $t_g$ of the centroid value thus obtained is greater than 3 msec but equal to or less than 15 msec, which is the range in which the period of the pitch of the human voice resides. When this condition is satisfied, the program proceeds to step S18, at which it is determined whether the component $p_g$ of the correlation value of the centroid is greater than a threshold value decided based upon experience. When this condition is satisfied, the program proceeds to step S19, at which it is judged that the input signal is that of the human voice. Here a decision is rendered to the fact that all of the signals in the first block presently undergoing processing are indicative of the human voice.

When it is judged that the input signal is not a voice, i.e., when the condition of step S17 or the condition of step S18 is not satisfied, the program proceeds to step S21.

It is determined at step S21 whether processing up to the final frame has ended or not. The program proceeds to step S22 if this processing has not ended.

At step S22, the third frame of the first block is extracted, processing (steps S10–S14) similar to that for the second frame is executed and the peak value is extracted. A new centroid of peak values is obtained using this extracted peak value and the centroid of the peak values of the first and second frames. Specifically, the centroid obtained by the first and second frames is substituted for the peak value of the first frame of FIG. 14(*a*), and the peak value of the third frame is substituted for the peak values of the second frame of FIG. 14(*b*), whereby a new centroid of peak values can be obtained.

The centroid thus obtained is the centroid up to the third frame. When this centroid satisfies the conditions of the human voice (steps S17 and S18), it is judged that the audio signal of the first block is a voice signal and a transition is made to the processing of the second block. When it is judged here that the audio signal is not a voice signal, the fourth frame of the first block is extracted and similar processing is executed. As a result, the centroid of peak values up to the fourth frame of the first block is obtained.

Thus, each frame of the first block is processed until a decision is rendered to the effect that the input audio signal is indicative of the human voice. When this decision is rendered, the value of the centroid obtained thus far is initialized and processing for extracting the centroid of the second block is executed anew.

If this decision to the effect that the input audio signal is a voice signal has not been rendered up to the final frame of the first block (that is, if the centroid has not satisfied the conditions of the human voice), it is judged finally that the audio signal of the first block is not a voice signal, the value of the centroid of peak values obtain thus far is initialized and centroid-extraction processing similar to that of the first block is applied from the second block onward.

The audio signal processing apparatus of this embodiment is provided for each microphone and a camera is controlled in accordance with the output indicative of the results of voice discrimination performed by each audio signal processor, whereby the system thus constructed can be utilized as a camera control system in a television conference. FIGS. 14(*a*)–14(*d*) are block diagrams illustrating this system. It should be noted that components identical with those shown in FIG. 9 are designated by like reference characters.

Figure 15:
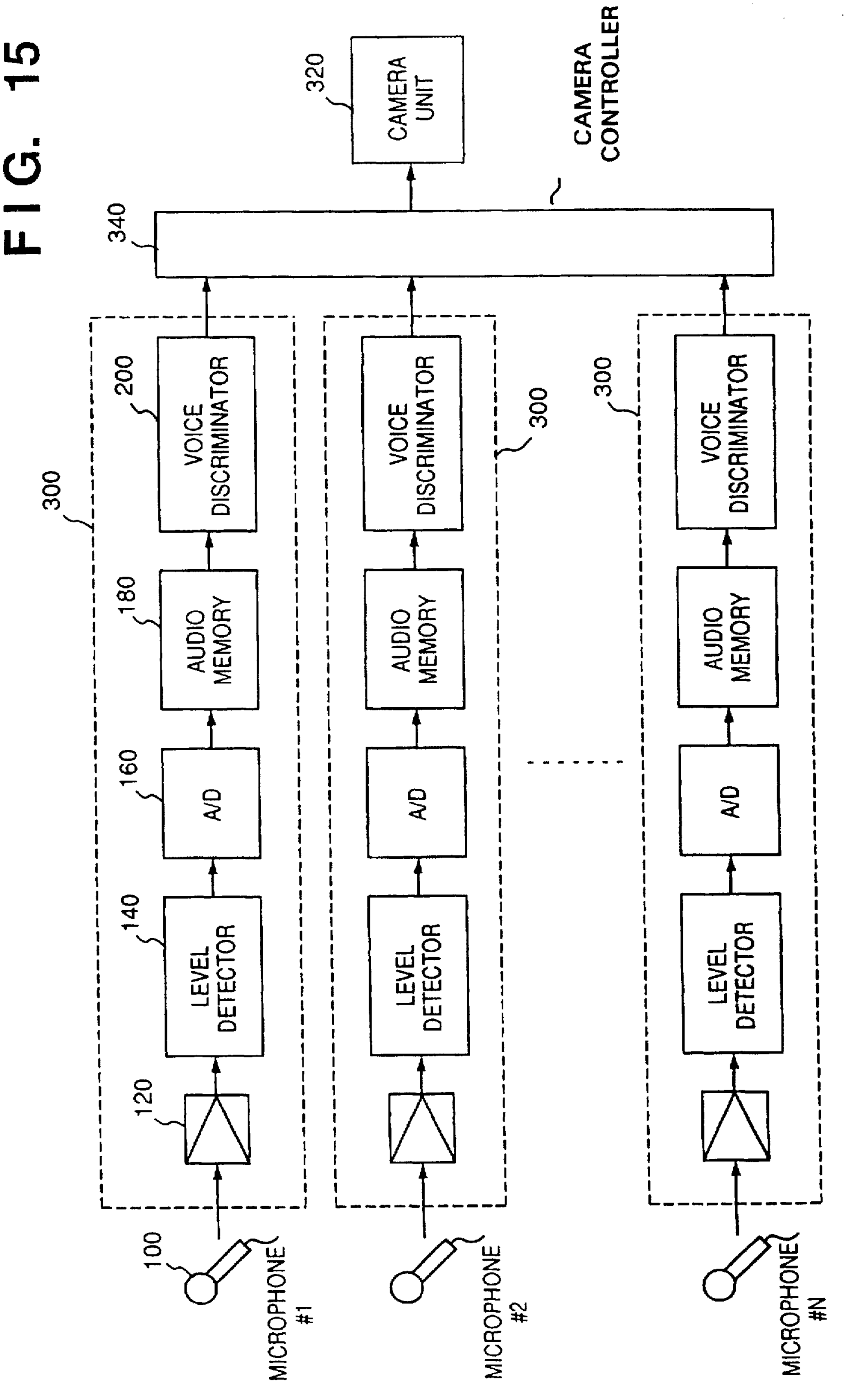
FIG. 15 is a block diagram showing an arrangement in which a voice discriminating processor of the third embodiment is applied to camera control.

In FIG. 15, numeral 300 denotes an audio signal processing apparatus constructed as shown in FIG. 9, 320 a camera unit, and 340 a camera control circuit which, in accordance with the output of the voice discriminating circuit 200 of the audio signal processing apparatus 300, controls the camera unit 320 in such a manner that the camera unit is pointed toward the individual using the microphone from which the voice signal entered. The camera control circuit 340 controls the camera unit 320 in accordance also with a camera control signal from a system control circuit, not shown.

Figure 16:
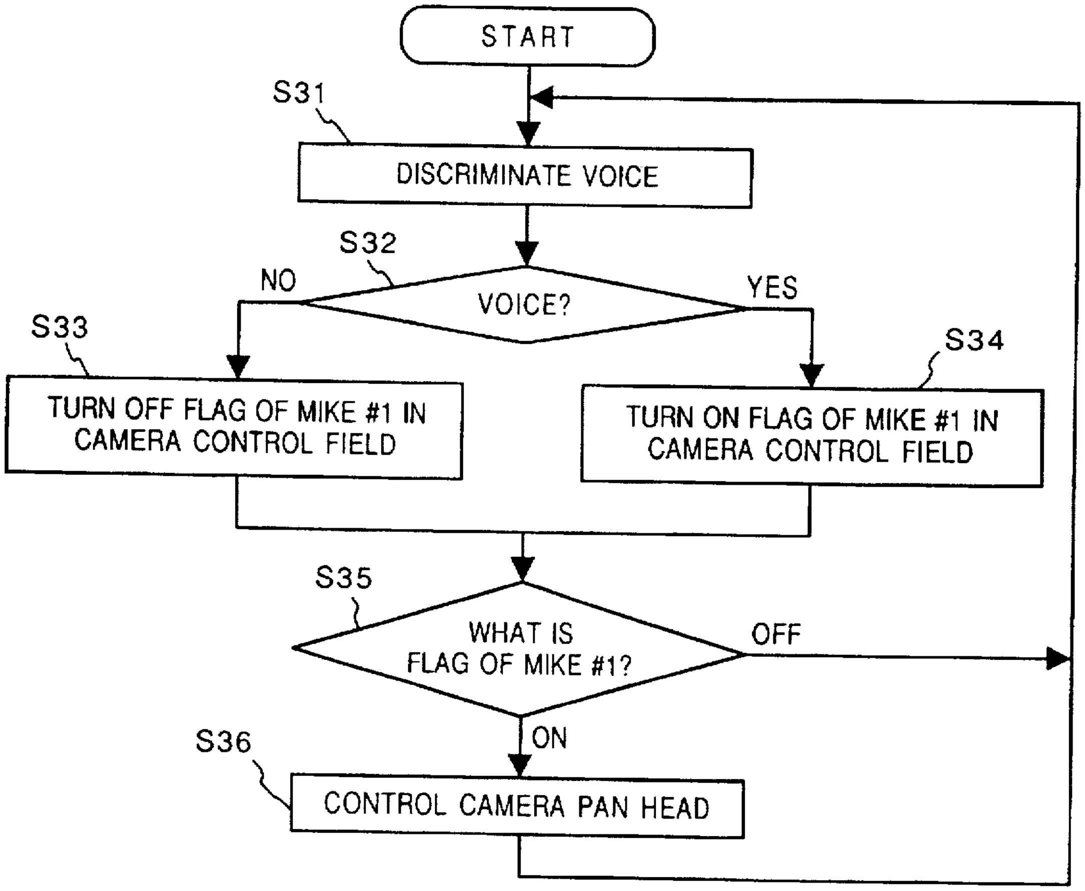
FIG. 16 is a flowchart showing a camera control method for camera control in response to an input from a microphone shown in FIG. 15.

FIG. 16 is a flowchart of camera control relating to microphone #1 shown in FIG. 15. Processing will be described with reference to this flowchart.

First, at step S31, the voice discriminating circuit 200 of the audio signal processing apparatus 300 discriminates whether the input audio signal is a voice signal or not.

Next, when it is found at step S32 that the result of discrimination at step S31 is indicative of a voice, the program proceeds to step S34, where the camera control circuit 340 raises a flag (not shown) for microphone #1 in a camera control field corresponding to microphone #1. On the other hand, when the result of discrimination at step S31 is not indicative of a voice, the program proceeds to step S33, where the above-mentioned flag for microphone #1 in the camera control field is cleared.

The camera control circuit 340 performs a check at step S35 to determine whether the flag of microphone #1 in the camera control field has been raised or not. If the flag has been raised, the program proceeds to step S36, at which the pan head of the camera unit 320 is controlled so as to point the camera unit at the individual using microphone #1. The program then returns to the processing of step S31.

Thus, as may be readily understood from the foregoing description, this embodiment makes it possible to accurately determine whether an input audio signal is that of a human voice. As a result, it is possible to prevent a camera from operating erroneously owing to for example noise in a television conference.

As many apparently widely different embodiments of the present invention can be made without departing from the spirit and scope thereof, it is to be understood that the invention is not limited to the specific embodiments thereof except as defined in the appended claims.

What is claimed is:

1. A signal processing method comprising:

an input step of entering an audio signal including a periodic audio signal with a predetermined period:

a level detecting step of detecting the level of the audio signal entered at said input step and generating a level signal;

a period detecting step of detecting a period of the audio signal entered at said input step; and a selecting step of selecting corresponding image pick-up means and inputting an image to said selected pick-up means if the level signal is greater than a prescribed threshold value, the period detected at said period detecting step falls within a prescribed range, wherein said selecting step selects the corresponding image pick-up means and inputs the image to said selected pick-up means if the level signal is greater than the prescribed threshold value, a centroid of autocorrelation values corresponding to respective periods detected at said period detecting step within a time duration T falls within a prescribed centroid range and an autocorrelation value corresponding to said centroid is greater than a prescribed threshold value.

2. The method according to claim 1, wherein the prescribed centroid range is approximately 3~15 msec.

3. A signal processing method comprising:

an input step of entering an audio signal including a periodic audio signal with a predetermined period;

a level detecting step of detecting the level of the audio signal entered at said input step and generating a level signal;

a period detecting step of detecting a period of the audio signal entered at said input step; and a selecting step of selecting corresponding image pick-up means and inputting an image to said selected pick-up means if the level signal is greater than a prescribed threshold value, the period detected at said period detecting step falls within a prescribed range, wherein said period detecting step includes:

a step of partitioning the audio signal entered at said input step into audio signals each of a time duration T;

a step of further partitioning each of the partitioned audio signals into audio signals each of a time duration t; and a frame period detecting step of detecting periodicity of the audio signals of time duration t.

4. The method according to claim 3, wherein said frame period detecting step includes calculating an autocorrelation function corresponding to the audio signals of time duration t and selecting a period corresponding to a maximum autocorrelation value, which is greater than the threshold value, from among autocorrelation values of said autocorrelation function.

5. The method according to claim 3, wherein said frame period detecting step includes generating a linear prediction equation, which is for approximating the audio signal of the time duration t, based upon the audio signal of the time duration t;

calculating an autocorrelation function relating to a residual signal between the audio signal of the time duration t and a predicted audio signal based upon the linear prediction equation; and selecting a period corresponding to a maximum autocorrelation value, which is greater than the threshold value, from among autocorrelation values of said autocorrelation function.

6. A signal processing method comprising:

an input step of entering an audio signal including a periodic audio signal with a predetermined period;

a level detecting step of detecting the level of the audio signal entered at said input step and generating a level signal;

a period detecting step of detecting a period of the audio signal entered at said input step; and an audio control output step of outputting a sound corresponding to the audio signal entered at said input step if the level signal is greater than a prescribed threshold value and the period detected at said period detecting step falls within a prescribed range, wherein said selecting step outputs a sound corresponding to the audio signal entered at said input step if the level signal is greater than the prescribed threshold value, a centroid of autocorrelation values corresponding to respective periods detected at said period detecting step within a time duration T falls within a prescribed centroid range and an auto correlation value corresponding to said centroid is greater than a prescribed threshold value.

7. The method according to claim 6, wherein the prescribed centroid range is approximately 3~15 msec.

8. A signal processing method comprising:

an input step of entering an audio signal including a periodic audio signal with a predetermined period;

a level detecting step of detecting the level of the audio signal entered at said input step and generating a level signal;

a period detecting step of detecting a period of the audio signal entered at said input step; and an audio control output step of outputting a sound corresponding to the audio signal entered at said input step if the level signal is greater than a prescribed threshold value and the period detected at said period detecting step falls within a prescribed range, wherein said period detecting step includes:

a step of partitioning the audio signal entered at said input step into audio signals each of a time duration T;

a step of further partitioning each of the partitioned audio signals into audio signals each of a time duration t; and a frame period detecting step of detecting periodicity of the audio signals of time duration t.

9. The method according to claim 8, wherein said frame period detecting step includes calculating an autocorrelation function corresponding to the audio signals of time duration t and selecting a period corresponding to a maximum autocorrelation value, which is greater than the threshold value, from among autocorrelation values of said autocorrelation function.

10. The method according to claim 8, wherein said frame period detecting step includes generating a linear prediction equation, which is for approximating the audio signal of the time duration t, based upon the audio signal of the time duration t;

calculating an autocorrelation function relating to a residual signal between the audio signal of the time duration t and a predicted audio signal based upon the linear prediction equation; and selecting a period corresponding to a maximum autocorrelation value, which is greater than the threshold value, from among autocorrelation values of said autocorrelation function.

11. A signal processing apparatus comprising:

input means for entering an audio signal including a periodic audio signal with a predetermined period;

level detecting means for detecting a level of the audio signal entered by said input means and generating a level signal;

period detecting means for detecting a period of the audio signal entered by said input means; and selecting means for selecting corresponding image pick-up means and inputting an image to said selected pick-up means if the level signal is greater than a prescribed threshold value and the period detected by said period detecting means falls within a prescribed range, wherein said selecting means selects the corresponding image pick-up means and inputs the image to said selected pick-up means if the level signal is greater than the prescribed threshold value, a centroid of autocorrelation values corresponding to respective periods detected by said period detecting means within a time duration T falls within a prescribed centroid range and an autocorrelation value corresponding to said centroid is greater than a prescribed threshold value.

12. The apparatus according to claim 11, wherein said frame period detecting means includes:

means for generating a linear prediction equation, which is for approximating the audio signal of the time duration t, based upon the audio signal of the time duration t;

means for calculating an autocorrelation function relating to a residual signal between the audio signal of the time duration t and a predicted audio signal based upon the linear prediction equation; and means for selecting a period corresponding to a maximum autocorrelation value, which is greater than the threshold value, from among autocorrelation values of said autocorrelation function.

13. The apparatus according to claim 11, wherein the prescribed centroid range is approximately 3~15 msec.

14. A signal processing apparatus comprising:

input means for entering an audio signal including a periodic audio signal with a predetermined period;

level detecting means for detecting a level of an audio signal entered by input means and generating a level signal;

period detecting means for detecting a period of the audio signal entered by said input means; and selecting means for selecting corresponding image pick-up means and inputting an image to said selected pick-up means if the level signal is greater than a prescribed threshold value and the period detected by said period detecting means falls within a prescribed range, wherein said period detecting means includes:

means for partitioning the audio signal entered by said input means into audio signals each of a time duration T;

means for further partitioning each of the partitioned audio signals into audio signals each of a time duration t; and frame period detecting means for detecting periodicity of the audio signals of time duration t.

15. The apparatus according to claim 14, wherein said frame period detecting means calculates an autocorrelation function corresponding to the audio signals of time duration t and selects a period corresponding to a maximum autocorrelation value, which is greater than the threshold value, from among autocorrelation values of said autocorrelation function.

16. A signal processing apparatus comprising:

input means for entering an audio signal including a periodic audio signal with a predetermined period;

level detecting means for detecting a level of the audio signal entered by said input means and generating a level signal;

period detecting means for detecting a period of the audio signal entered by said input means; and audio control output means for outputting a sound corresponding to the audio signal entered by said input means if the level signal is greater than a prescribed threshold value and the period detected by said period detecting means falls within a prescribed range, wherein said selecting means outputs a sound corresponding to the audio signal entered by said input means if the level signal is greater than the prescribed threshold value, a centroid of autocorrelation values corresponding to respective periods detected by said period detecting means within a time duration T falls within a prescribed centroid range and an autocorrelation value corresponding to said centroid is greater than a prescribed threshold value.

17. The apparatus according to claim 16, wherein the prescribed centroid range is approximately 3~15 msec.

18. A signal processing apparatus comprising:

input means for entering an audio signal including a periodic audio signal with a predetermined period;

level detecting means for detecting a level of the audio signal entered by said input means and generating a level signal;

period detecting means for detecting a period of the audio signal entered by said input means; and audio control output means for outputting a sound corresponding to the audio signal entered by said input means if the level signal is greater than a prescribed threshold value and the period detected by said period detecting means falls within a prescribed range, wherein said period detecting means includes:

means for partitioning the audio signal entered by said input means into audio signals each of a time duration T;

means for further partitioning each of the partitioned audio signals into audio signals each of a time duration t; and frame period detecting means for detecting periodicity of the audio signals of time duration t.

19. The apparatus according to claim 18, wherein said frame period detecting means calculates an autocorrelation function corresponding to the audio signals of time duration t and selects a period corresponding to a maximum autocorrelation value, which is greater than the threshold value, from among autocorrelation values of said autocorrelation function.

20. The apparatus according to claim 18, wherein said frame period detecting means includes:

means for generating a linear prediction equation, which is for approximating the audio signal of the time duration t, based upon the audio signal of the time duration t;

means for calculating an autocorrelation function relating to a residual signal between the audio signal of the time duration t and a predicted audio signal based upon the linear prediction equation; and means for selecting a period corresponding to a maximum autocorrelation value, which is greater than the threshold value, from among autocorrelation values of said autocorrelation function.

* * * * *

UNITED STATES PATENT AND TRADEMARK OFFICE

CERTIFICATE OF CORRECTION

PATENT NO. : 5,764,779

DATED : June 9, 1998

INVENTOR(S) : Masaki Haranishi

It is certified that error appears in the above-identified patent and that said Letters Patent is hereby corrected as shown below:

On the cover page, after "[30] Foreign Application Priority Data" add the following application:

June 14, 1994 [JP] Japan..........6-131529

Signed and Sealed this

Sixth Day of October, 1998

Attest:

BRUCE LEHMAN

*Attesting Officer*

*Commissioner of Patents and Trademarks*

UNITED STATES PATENT AND TRADEMARK OFFICE
CERTIFICATE OF CORRECTION

PATENT NO. : 5,764,779

DATED : June 9, 1998

INVENTOR(S) : Masaki Haranishi

It is certified that error appears in the above-identified patent and that said Letters Patent is hereby corrected as shown below:

Col. 1, line 14, change "unnecessary" to --undesirable--.

Col. 1, line 32, delete "in" and change "control is performed" to --is controlled--.

Col. 2, line 2, change "an" to --a--.

Col. 3, line 14, change "an" to --a--.

Col. 8, line 17, after "switch 13", second occurrence, insert --,--.

Col. 14, line 27, change "in" to --during--.

Col. 18, line 57 after "to" insert --,-- and after "example" insert --,--.

Signed and Sealed this

Eighth Day of December, 1998

Attest:

Bruce Lehman

BRUCE LEHMAN

*Attesting Officer*

*Commissioner of Patents and Trademarks*